US010332065B2

(12) United States Patent
Ferguson et al.

(10) Patent No.: US 10,332,065 B2
(45) Date of Patent: Jun. 25, 2019

(54) FLEET OF ROBOT VEHICLES FOR FOOD PRODUCT PREPARATION

(71) Applicant: Nuro, Inc., Mountain View, CA (US)

(72) Inventors: David Ferguson, San Francisco, CA (US); Jiajun Zhu, Palo Alto, CA (US); Nan Ransohoff, San Francisco, CA (US); Pichayut Jirapinyo, San Francisco, CA (US)

(73) Assignee: NURO, INC., Mountain View, CA (US)

(*) Notice: Subject to any disclaimer, the term of this patent is extended or adjusted under 35 U.S.C. 154(b) by 0 days.

(21) Appl. No.: 16/047,598

(22) Filed: Jul. 27, 2018

(65) Prior Publication Data

US 2019/0056751 A1   Feb. 21, 2019

Related U.S. Application Data

(60) Provisional application No. 62/538,538, filed on Jul. 28, 2017.

(51) Int. Cl.
*G06Q 50/12* (2012.01)
*B60P 3/20* (2006.01)
(Continued)

(52) U.S. Cl.
CPC ............ *G06Q 10/0837* (2013.01); *A23L 2/52* (2013.01); *A23L 5/00* (2016.08); *A23L 7/109* (2016.08);
(Continued)

(58) Field of Classification Search
CPC ........... B60P 3/20; B60P 3/007; B60P 3/0257; G06Q 50/12
(Continued)

(56) References Cited

U.S. PATENT DOCUMENTS 9,292,889 B2   3/2016   Garden
10,140,587 B2 *  11/2018   Garden ................. G06Q 50/12
(Continued)

FOREIGN PATENT DOCUMENTS

EP    1989980 A1   11/2008
EP    2759990 A1    7/2014
WO  2016183525 A1   11/2016

OTHER PUBLICATIONS

Notification of Transmittal of the International Search Report and the Written Opinion of the International Search Authority, or the Declaration issued in corresponding application No. PCT/US2018/044100 dated Nov. 2, 2018, 18 pages.
(Continued)

*Primary Examiner* — Michael A Laflame, Jr.
(74) *Attorney, Agent, or Firm* — Carter, DeLuca & Farrell LLP; George Likourezos, Esq.

(57) ABSTRACT

An autonomous robot vehicle in accordance with aspects of the present disclosure includes a conveyance system, a navigation system, a communication system configured to communicate with a food delivery management system, one or more storage modules including a storage compartment or a storage sub-compartment configured to store food items, one or more preparation modules including a preparation compartment or a preparation sub-compartment configured to prepare the food items, processor(s), and a memory storing instructions. The instructions, when executed by the processor(s), cause the autonomous robot vehicle to, autonomously, receive via the communication system a food order for a destination, determine a travel route that includes the destination, control the conveyance system to travel the travel route to reach the destination, and prepare the food item while traveling on the travel route.

20 Claims, 15 Drawing Sheets

(51) Int. Cl.
| | |
|---|---|
| B60P 3/00 | (2006.01) |
| G06Q 10/08 | (2012.01) |
| B65G 67/24 | (2006.01) |
| G01C 21/34 | (2006.01) |
| G05D 1/00 | (2006.01) |
| G06K 9/00 | (2006.01) |
| G05D 1/02 | (2006.01) |
| G06Q 10/06 | (2012.01) |
| G06Q 50/28 | (2012.01) |
| G06Q 30/06 | (2012.01) |
| G06Q 50/30 | (2012.01) |
| G07F 17/00 | (2006.01) |
| G08G 1/00 | (2006.01) |
| B60P 1/36 | (2006.01) |
| G06K 7/10 | (2006.01) |
| G06K 19/06 | (2006.01) |
| G06K 19/07 | (2006.01) |
| G06N 20/00 | (2019.01) |
| B60P 3/025 | (2006.01) |
| G06K 7/14 | (2006.01) |
| G06Q 20/18 | (2012.01) |
| G06Q 20/00 | (2012.01) |
| G08G 1/04 | (2006.01) |
| A23L 5/00 | (2016.01) |
| H04W 4/024 | (2018.01) |
| H04W 4/40 | (2018.01) |
| G07F 17/12 | (2006.01) |
| G06Q 30/02 | (2012.01) |
| B60H 1/00 | (2006.01) |
| G01C 21/20 | (2006.01) |
| B60R 25/25 | (2013.01) |
| H04L 29/08 | (2006.01) |
| G06Q 20/12 | (2012.01) |
| B60R 19/18 | (2006.01) |
| B60R 19/48 | (2006.01) |
| B60R 21/34 | (2011.01) |
| B60R 21/36 | (2011.01) |
| G05D 1/12 | (2006.01) |
| A23L 7/109 | (2016.01) |
| A23L 2/52 | (2006.01) |
| A47J 37/06 | (2006.01) |
| H05B 6/68 | (2006.01) |
| A47J 47/00 | (2006.01) |
| G06F 16/955 | (2019.01) |
| G06F 3/0484 | (2013.01) |
| H04N 5/76 | (2006.01) |

(52) U.S. Cl.
CPC ........... *A47J 37/0658* (2013.01); *A47J 47/00* (2013.01); *B60H 1/00364* (2013.01); *B60H 1/00735* (2013.01); *B60P 1/36* (2013.01); *B60P 3/007* (2013.01); *B60P 3/0257* (2013.01); *B60R 19/18* (2013.01); *B60R 19/483* (2013.01); *B60R 21/34* (2013.01); *B60R 21/36* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 9/00201* (2013.01); *G06K 9/00791* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/08355* (2013.01); *G06Q 20/00* (2013.01); *G06Q 20/127* (2013.01); *G06Q 20/18* (2013.01); *G06Q 30/0266* (2013.01); *G06Q 30/0631* (2013.01); *G06Q 30/0645* (2013.01); *G06Q 50/12* (2013.01); *G06Q 50/28* (2013.01); *G06Q 50/30* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *H05B 6/688* (2013.01); *A23V 2002/00* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01)

(58) Field of Classification Search
USPC .......................... 99/324–327, 280–281, 288
See application file for complete search history.

(56) References Cited

U.S. PATENT DOCUMENTS

| | | | |
|---|---|---|---|
| 2002/0048624 A1* | 4/2002 | Blanchet | A21B 1/00 426/391 |
| 2010/0084426 A1 | 4/2010 | Devers et al. | |
| 2010/0100241 A1* | 4/2010 | Jarisch | A47J 31/407 700/259 |
| 2014/0081445 A1 | 3/2014 | Villamar | |
| 2014/0370167 A1 | 12/2014 | Garden | |
| 2015/0006005 A1 | 1/2015 | Yu et al. | |
| 2015/0202770 A1 | 7/2015 | Patron et al. | |
| 2017/0174343 A1 | 6/2017 | Erickson et al. | |
| 2018/0158153 A1* | 6/2018 | Ekin | G06Q 50/12 |
| 2018/0321679 A1* | 11/2018 | Nixon | G05D 1/0088 |
| 2018/0330313 A1* | 11/2018 | Clarke | B60P 3/007 |
| 2019/0049988 A1* | 2/2019 | Meij | G06Q 50/28 |

OTHER PUBLICATIONS

Notification of Transmittal of the International Search Report and the Written Opinion of the International Search Authority, or the Declaration issued in corresponding application No. PCT/US2018/044361 dated Oct. 10, 2018, 12 pages.

* cited by examiner

FLEET OF ROBOT VEHICLES FOR FOOD PRODUCT PREPARATION

CROSS-REFERENCE TO RELATED APPLICATIONS

The present application claims priority to U.S. Provisional Application No. 62/538,538, filed on Jul. 28, 2017, which is hereby incorporated by reference in its entirety.

FIELD OF THE TECHNOLOGY

The present application relates to autonomous vehicles, and in particular, to autonomous vehicles for handling and delivering food items.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications.

In the consumer space, handling and delivery of food by autonomous vehicles could improve society in many ways. For example, rather than spending time driving to a restaurant, a person can instead engage in productive work while waiting for an autonomous vehicle to deliver the food. With fewer vehicles on the road, traffic conditions would also improve. For example, instead of several people driving to restaurants in several vehicles, a single autonomous vehicle could deliver food to those people and thereby reduce the number of vehicles on the road. Accordingly, there is interest in developing technologies for handling and delivering food by autonomous vehicles.

SUMMARY

This disclosure relates to a fully-autonomous and/or semi-autonomous robot fleet and, in particular, to a fleet of robot vehicles for transporting or retrieving deliveries in either unstructured outdoor environment or closed environments. In one aspect, the present disclosure provides systems and autonomous vehicles for receiving food orders for food items to be delivered to delivery destinations, where the food items are prepared on the autonomous vehicles en route to the delivery destination. In one aspect, the present disclosure provides systems and autonomous vehicles for receiving food orders for heated food items to be delivered to delivery destinations, where the food items are heated on the autonomous vehicles en route to the delivery destination. In various embodiments, the autonomous vehicles can be land vehicles, water vehicles, and/or aerial vehicles, among others.

In accordance with aspects of the present disclosure, an autonomous robot vehicle includes a conveyance system, a navigation system configured to navigate to destinations, a communication system configured to communicate with a food delivery management system, one or more storage modules including a storage compartment and/or a storage sub-compartment configured to store food items, one or more preparation modules including a storage compartment and/or a preparation sub-compartment configured to prepare the food items, one or more processors, and a memory. The memory stores instructions which, when executed by the processor(s), cause the autonomous robot vehicle to, autonomously, receive via the communication system a food order for a destination, determine via the navigation system a travel route that includes the destination, control the conveyance system to travel the travel route to reach the destination, and prepare via the preparation module(s) a food item corresponding to the food order while traveling on the travel route.

In various embodiments, the preparation module(s) include a toaster, a toaster oven, a broiler, an air fryer, a microwave, an oven, a griddle, a grill, a kettle, and/or a coffee maker.

In various embodiments, the food items include frozen food, the storage module(s) include a temperature controlled storage compartment and/or a temperature controlled storage sub-compartment, and the preparation module(s) include the microwave In various embodiments, the food items include pizza and/or pastries, and the preparation module(s) include an oven, a toaster oven, and/or a broiler.

In various embodiments, the storage module(s) include ingredients and the preparation module(s) include a mixer configured to mix the ingredients. In various embodiments, the ingredients include salad ingredients, and the instructions, when executed by the at least one processor, cause the mixer to mix the salad ingredients to prepare a salad food order. In various embodiments, the ingredients include beverage ingredients, and the instructions, when executed by the at least one processor, cause the mixer to mix the beverage ingredients to prepare a mixed beverage food order.

In various embodiments, the preparation module(s) include one or more containers and the storage module(s) include a dispenser, and the instructions, when executed by the at least one processor, cause the dispenser to dispense liquid into the container(s). In various embodiments, the container(s) include pasta, rice, and/or instant noodles, and the dispenser is configured to dispense water into the at least one container. In various embodiments, the preparation module(s) further include a heating element configured to heat the container(s). In various embodiments, the dispenser is configured to dispense coffee or tea into the container(s).

In various embodiments, in determining the travel route that includes the destination, the instructions, when executed by the processor(s), cause the autonomous robot vehicle to evaluate a plurality of possible travel routes having different travel times to reach the destination, where the travel routes are provided by the navigation system, and select one of the possible travel routes as the travel route based on a travel time sufficient to prepare the food item prior to reaching the destination.

In various embodiments, in selecting one of the possible travel routes, the instructions, when executed by the processor(s), cause the autonomous robot vehicle to select the travel route in which a time to prepare the food item is longer than the travel time to reach the destination, and determine that travel to the destination will need to be delayed by performing at least one of: parking for a period of time or circling for a period of time. In various embodiments, in preparing the food item while traveling on the travel route, the instructions, when executed by the at least one processor, cause the autonomous robot vehicle to begin preparing the food item as soon as one of the preparation module(s) is available.

In various embodiments, in selecting one of the possible travel routes, the instructions, when executed by the processor(s), cause the autonomous robot vehicle to select the travel route in which a time to prepare the food item is shorter than the travel time to reach the destination, where preparing the food item while traveling on the travel route includes delaying the preparation of the food item. In various embodiments, in preparing the food item while traveling on the travel route, the instructions, when executed by the at least one processor, cause the autonomous robot vehicle to begin preparing the food item when remaining travel time to reach the destination is longer than the time to prepare the food item by a predetermined threshold.

In various embodiments, the autonomous robot vehicle includes a plurality of preparation modules, and the instructions, when executed by the processor(s), further cause the autonomous robot vehicle to receive, via the communication system, a plurality of additional food orders, and schedule the food order and the plurality of additional food orders to the plurality of preparation modules for concurrently preparing at least two food orders.

In accordance with aspects of the present disclosure, a system for managing a fleet of autonomous robot vehicles for food delivery includes a communication system configured to communicate with each autonomous robot vehicle of a fleet of autonomous robot vehicles and to receive food orders from software applications on customer devices, a database configured to store information for each autonomous robot vehicle of the fleet where the information includes equipment inventory and food inventory for each autonomous robot vehicle, one or more processors, and a memory. The memory stores instructions which, when executed by the processor(s), cause the system to receive a food order from a software application on a customer device where the food order is an order for food to be prepared en route to a delivery destination, identify, based on the equipment inventory and food inventory information in the database, particular autonomous robot vehicles in the fleet capable of fulfilling the food order, and communicate via the communication system with one or more of the particular autonomous robot vehicles regarding the food order.

In various embodiments, the equipment inventory information indicates whether each autonomous robot vehicle includes a temperature controlled storage compartment and/or a temperature controlled storage sub-compartment. In various embodiments, the equipment inventory information indicates whether each autonomous robot vehicle includes a toaster, a toaster oven, a broiler, an air fryer, a microwave, an oven, a griddle, a grill, a kettle, and/or a coffee maker.

In various embodiments, the food inventory information indicates whether each autonomous robot vehicle includes at least one of: pizzas, pastries, frozen foods, salads, mixed beverages, coffee, tea, pasta, rice, or instant noodles.

In various embodiments, the instructions, when executed by processor(s), further cause the system to forecast one or more future food orders based on historical food orders, and instruct one or more autonomous robot vehicles of the fleet to preemptively prepare the future food order(s).

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
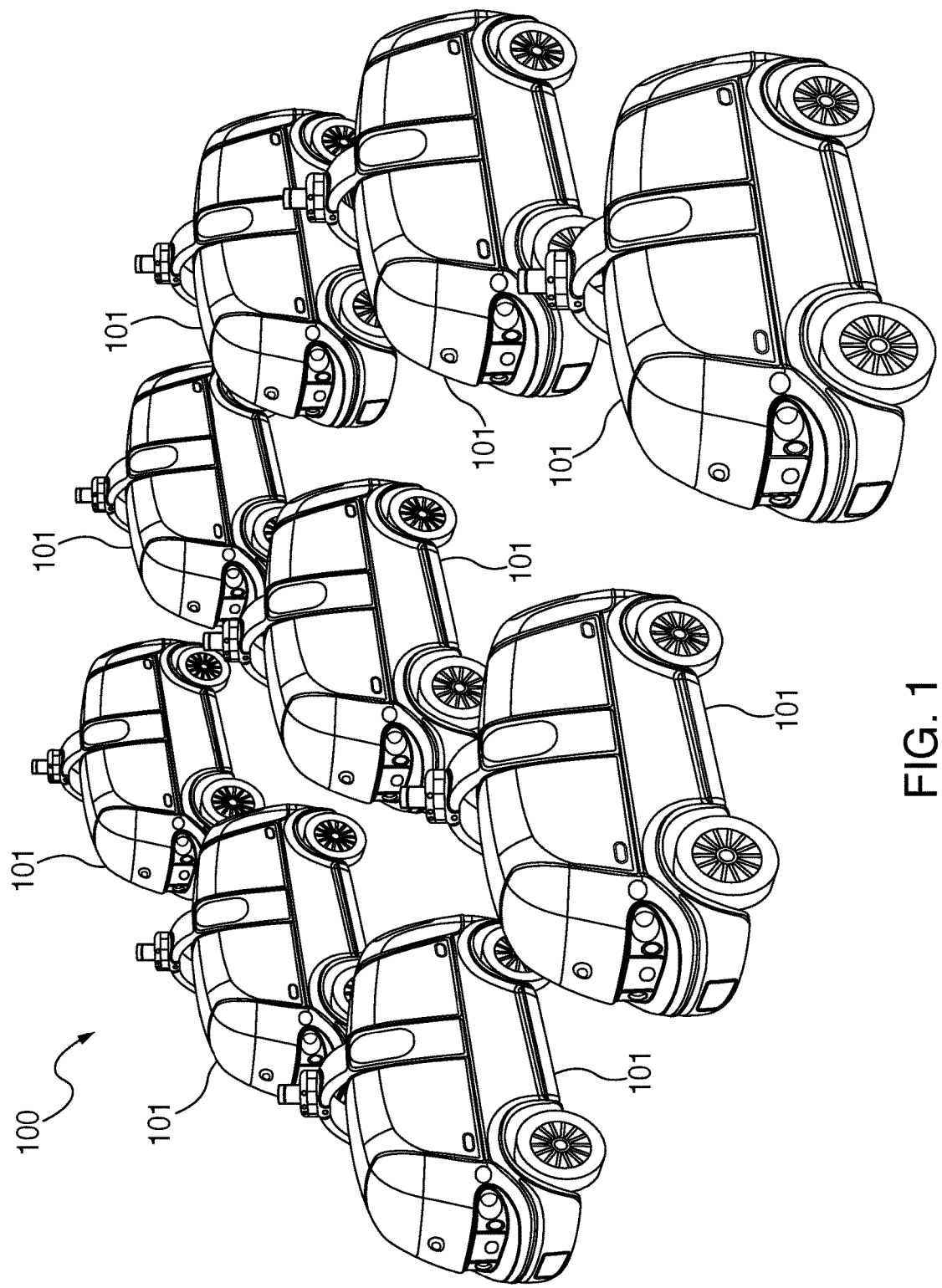
FIG. 1 is an exemplary view an autonomous robot fleet, wherein each vehicle within a fleet or sub-fleet can be branded for an entity.

This disclosure relates to a fully-autonomous and/or semi-autonomous robot fleet and, in particular, to robot vehicles for transporting or retrieving deliveries in either open unstructured outdoor environments or closed environments. In one aspect, the present disclosure provides systems and autonomous vehicles for receiving food orders for heated food items to be delivered to delivery destinations, where the food items are heated on the autonomous vehicles en route to the delivery destination. In this manner, food items delivered to a destination can be fresher and less susceptible to problems with existing heated delivery, such as dryness from overheating or sogginess from steam, among other problems.

Provided herein is a robot fleet having robot vehicles operating fully-autonomously or semi-autonomously and a fleet management module for coordination of the robot fleet, where each robot within the fleet is configured for transporting, delivering or retrieving goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer a customer group within a marketplace, or provider and provide entry when authorized, a communication module and a processor configured to manage the conveyance system, the navigation module, the sensor system, the communication module and the controller.

As used herein, the term "autonomous" includes fully-autonomous, semi-autonomous, and any configuration in which a vehicle can operate in a controlled manner for a period of time without human intervention.

As used herein, the term "fleet," "sub-fleet," and like terms are used to indicate a number of land vehicles, watercraft or aircraft operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the term "compartment" is used to indicate an internal bay of a robot vehicle that has a dedicated door at the exterior of the vehicle for accessing the bay, and also indicates an insert secured within the bay.

As used herein, the term "sub-compartment" is used to indicate a subdivision or portion of a compartment.

As used herein, the term "user," "operator," "fleet operator," and like terms are used to indicate the entity that owns or is responsible for managing and operating the robot fleet.

As used herein, the term "customer" and like terms are used to indicate the entity that requests the services provided the robot fleet.

As used herein, the term "provider," "business," "vendor," "third party vendor," and like terms are used to indicate an entity that works in concert with the fleet owner or operator to utilize the services of the robot fleet to deliver the provider's product from and or return the provider's product to the provider's place of business or staging location.

As used herein, the term "server," "computer server," "central server," "main server," and like terms are used to indicate a computer or device on a network that manages the fleet resources, namely the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The Fleet of Robot Vehicles

Provided herein is a robot fleet 100, as illustrated in FIG. 1, having robot vehicles 101, with each one operating fully-autonomously or semi-autonomously.

As illustrated in FIGS. 3-6, one exemplary configuration of a robot 101 is a vehicle configured for land travel, such as a small fully-autonomous (or semi-autonomous) automobile. The exemplary fully-autonomous (or semi-autonomous) automobile is narrow (i.e., 2-5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land vehicle robot units in the fleet are configured with a maximum speed range from 1.0 mph to about 90.0 mph for high speed, intrastate or interstate driving. Each robot in the fleet is equipped with onboard sensors 170 (e.g., cameras (running at a high frame rate, akin to video), LiDAR, radar, ultrasonic sensors, microphones, etc.) and internal computer processing to constantly determine where it can safely navigate, what other objects are around each robot and what it may do.

In some embodiments, the robot fleet is fully-autonomous.

In some embodiments, the robot fleet is semi-autonomous. In some embodiments, it may be necessary to have human interaction between the robot 101, the fleet operator 200, the provider 204 and/or the customer 202 to address previously unforeseen issues (e.g., a malfunction with the navigation module; provider inventory issues; unanticipated traffic or road conditions; or direct customer interaction after the robot arrives at the customer location).

In some embodiments, the robot fleet 100 is controlled directly by the user 200. In some embodiments, it may be necessary to have direct human interaction between the robot 101 and/or the fleet operator 200 to address maintenance issues such as mechanical failure, electrical failure or a traffic accident.

In some embodiments, the robot fleet is configured for land travel. In some embodiments, each robot land vehicle in the fleet is configured with a working speed range from 13.0 mph to 45.0 mph. In some embodiments, the land vehicle robot units in the fleet are configured with a maximum speed range from 13.0 mph to about 90.0 mph.

In some embodiments, the robot fleet is configured for water travel as a watercraft and is configured with a working speed range from 1.0 mph to 45.0 mph.

In some embodiments, the robot fleet is configured for hover travel as an over-land or over-water hovercraft and is configured with a working speed range from 1.0 mph to 60.0 mph.

In some embodiments, the robot fleet is configured for air travel as an aerial drone or aerial hovercraft and is configured with a working speed range from 1.0 mph to 80.0 mph.

In some embodiments of the robot fleet, the autonomous robots within the fleet are operated on behalf of third party vendor/service provider.

For example, a fleet management service is established to provide a roving delivery service for a third party beverage/food provider (e.g., a coffee service/experience for a third party vendor (i.e., Starbucks)). It is conceived that the fleet management service would provide a sub-fleet of "white label" vehicles carrying the logo and products of that third party beverage/food provider to operate either fully-autonomously or semi-autonomously to provide this service.

In some embodiments of the robot fleet, the autonomous robots within the fleet are further configured to be part of a sub-fleet of autonomous robots, and each sub-fleet is configured to operate independently or in tandem with multiple sub-fleets having two or more sub-fleets (100-a, 100-b).

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they aren't using the vehicles, the vehicles are used for general services within the fleet (e.g., other third parties).

In some embodiments, the robot fleet is controlled directly by the user.

In some embodiments, there will likely be times when a vehicle breaks down, has an internal system or module failure or is in need of maintenance. For example, in the event that the navigation module should fail, each robot within the fleet is configurable to allow for direct control of the robot's processor to override the conveyance and sensor systems (i.e., cameras, etc.) by a fleet operator to allow for the safe return of the vehicle to a base station for repair.

The Operating Environments

In some embodiments, the unstructured open environment is a non-confined geographic region accessible by navigable pathways, including, for example, public roads, private roads, bike paths, open fields, open public lands, open private lands, pedestrian walkways, lakes, rivers or streams.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the unstructured open environment is a non-confined airspace or even near-space environment which includes all main layers of the Earth's atmosphere including the troposphere, the stratosphere, the mesosphere, the thermosphere and the exosphere.

In some embodiments, the navigation module controls routing of the conveyance system of the robots in the fleet in the unstructured open or closed environments.

The Fleet Management Module

In some embodiments of the robot fleet 100, the fleet includes a fleet management module 120 (associated with a central server) for coordination of the robot fleet 100 and assignment of tasks for each robot 101 in the fleet. The fleet management module coordinates the activity and positioning of each robot in the fleet. In addition to communicating with the robot fleet, fleet owner/operator and/or user, the fleet management module also communicates with providers/vendors/businesses and customers to optimize behavior of the entire system.

The fleet management module works in coordination with a central server 110, typically located in a central operating facility owned or managed by the fleet owner 200.

Figure 11:
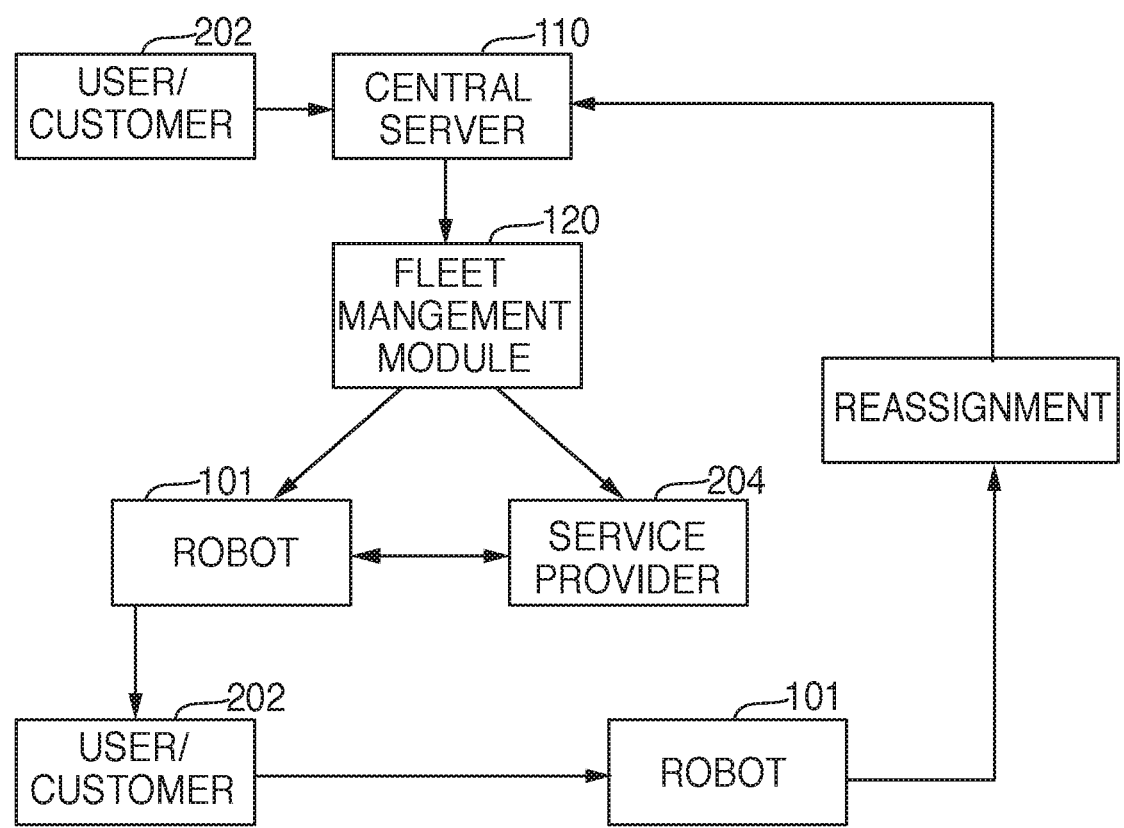
FIG. 11 is an exemplary flowchart representation of the logic for a fleet management control module associated with a central server for the robot fleet.

As illustrated in FIG. 11, in one embodiment, a request is sent to a main server 110 (typically located at the fleet owner's or fleet manager's location), which then communicates with the fleet management module 120. The fleet management module then relays the request to the appropriate provider 204 of the service (e.g., restaurant, delivery service, vendor or retailer) and an appropriate robot or robots 101 in the fleet. The best appropriate robot(s) in the fleet within the geographic region and typically closest to the service provider, is then assigned the task, and the provider of the service 204 then interacts with that robot 101 at their business (e.g., loading it with goods, if needed). The robot then travels to the customer 202 and the customer interacts with the robot to retrieve their goods or service (e.g., the goods ordered). An interaction can include requesting the robot to open its compartment 102, 104 through the customer's app or through a user interface on the robot itself (using, e.g., RFID reader and customer phone, a touchpad, a keypad, voice commands, vision-based recognition of the person, etc.). Upon completion of the delivery (or retrieval, if appropriate), the robot reports completion of the assignment and reports back to the fleet management module for re-assignment.

Figure 12:
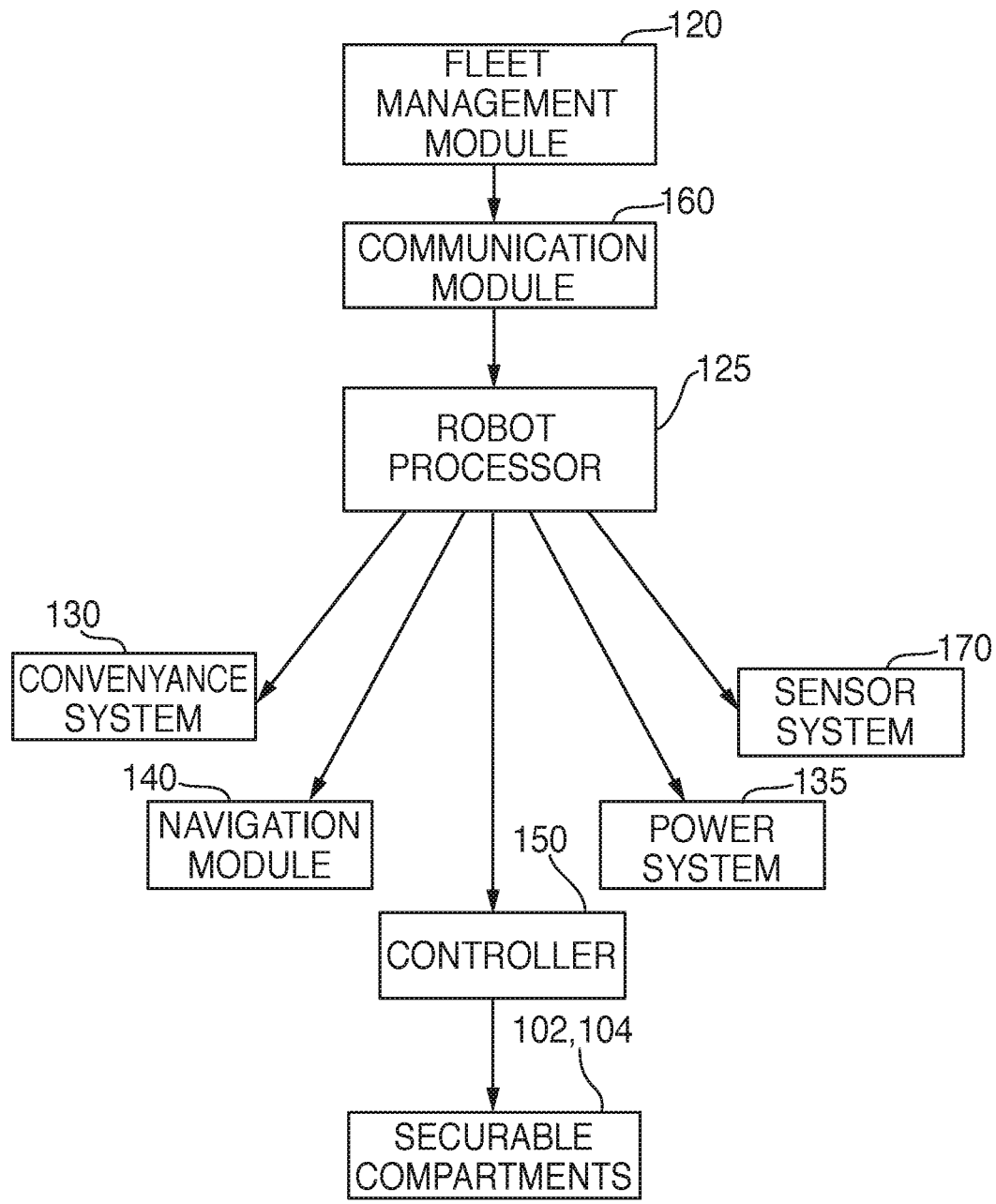
FIG. 12 is an exemplary flowchart representation of the logic flow from the Fleet Management Control Module through the robot processor to the various systems and modules of the robot.

As further illustrated in FIG. 12, and previously noted, in some embodiments, the fleet management module 120 handles coordination of the robot fleet 100 and assignment of tasks for each robot 101 in the fleet. The fleet management module coordinates the activity and positioning of each robot in the fleet. The fleet management module also communicates with vendors/businesses 204 and customers 202 to optimize behavior of entire system. It does this by utilizing the robot's processor 125 to process the various inputs and outputs from each of the robot's systems and modules, including: the conveyance system 130, the power system 135, the navigation module 140, the sensor system 170, 175, the communication module 160, and the controller 150, to effectively manage and coordinate the various functions of each robot in the fleet.

In some embodiments, the robot may be requested for a pick-up of an item (e.g., a document) with the intent of delivery to another party. In this scenario, the fleet management module would assign the robot to arrive at a given location, assign a securable compartment for receipt of the item, confirm receipt from the first party to the fleet management module, then proceed to the second location where an informed receiving party would recover the item from the robot using an appropriate PIN or other recognition code to gain access to the secure compartment. The robot would then reports completion of the assignment and report back to the fleet management module for re-assignment.

In accordance with aspects of the present disclosure, the central server 110 and/or the fleet management module 120 can include or can be part of a food delivery management system, which will be described in more detail in connection with FIGS. 15 and 16.

Conveyance Systems

Each robot vehicle 101 in the fleet includes a conveyance system 130 (e.g., a drive system with a propulsion engine, wheels, treads, wings, rotors, blowers, rockets, propellers, brakes, etc.).

As noted previously, the robot fleet is configurable for land, water or air. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land, and water types), unmanned aircraft, and unmanned spacecraft.

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system 135 to provide back-up emergency power or power for minor low-power sub-systems.

Alternative configurations of components to a total drive system with a propulsion engine could include wheels, treads, wings, rotors, blowers, rockets, propellers, brakes, etc.

In some embodiments, the robot fleet is configured for water travel as a watercraft with a propulsion system (engine) that is configurable as a gas engine, a turbine engine, an electric motor and/or a hybrid gas/electric engine and is further configured with a propeller.

In some embodiments, the robot fleet is configured for hover travel as an over-land or over-water hovercraft or an air-cushion vehicle (ACV) and is configured with blowers to produce a large volume of air below the hull that is slightly above atmospheric pressure. The propulsion system (engine) is configurable as a gas engine, a turbine engine, an electric motor and/or a hybrid gas/electric engine.

In some embodiments, the robot fleet is configured for air travel as an aerial drone or aerial hovercraft and is configured with wings, rotors, blowers, rockets, and/or propellers and an appropriate brake system. The propulsion system (engine) is configurable as a gas engine, a turbine engine, an electric motor and/or a hybrid gas/electric engine.

The Power System

In some embodiments, each robot of the robot fleet is configured with one or more power sources, which include the power system 135 (e.g., battery, solar, gasoline, propane, etc.).

Navigation Module

Each robot in the fleet further includes a navigation module 140 for navigation in the unstructured open or closed environments (e.g., digital maps, HD maps, GPS, etc.). In some embodiments, the fleet 100 relies on maps generated by the user, operator, or fleet operator, specifically created to cover the intended environment where the robot is configured to operate. These maps would then be used for general guidance of each robot in the fleet, which would augment this understanding of the environment by using a variety of on-board sensors such as cameras, LiDAR, altimeters or radar to confirm its relative geographic position and elevation.

In some embodiments, for navigation, the fleet of robots uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the fleet incorporates on-line maps to augment internal maps. This information is then combined to determine a safe, robust trajectory for the robot to follow and this is then executed by the low level actuators on the robot.

In some embodiments, the fleet relies on a global positioning system (GPS) that allows land, sea, and airborne users to determine their exact location, velocity, and time 24 hours a day, in all weather conditions, anywhere in the world.

In some embodiments, the fleet of robots will use a combination of internal maps, sensors and GPS systems to confirm its relative geographic position and elevation.

In some embodiments, the autonomous fleet is strategically positioned throughout a geographic region in anticipation of a known demand.

Over time, a user 200 and/or a vendor 204 can anticipate demand for robot services by storing data concerning how many orders (and what type of orders) are made at particular times of day from different areas of the region. This can be done for both source (e.g., restaurants, grocery stores, general businesses, etc.) and destination (e.g., customer, other businesses, etc.). Then, for a specific current day and time, this stored data is used to determine what the optimal location of the fleet is given the expected demand. More concretely, the fleet can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet so that the fleet optimally covers the weighted locations based on these numbers.

In some embodiments of the robot fleet, the positioning of robots can be customized based on: anticipated use, a pattern of historical behaviors, or specific goods being carried.

Sensor Systems

As noted previously, each robot is equipped with a sensor system 170, which includes at least a minimum number of onboard sensors (e.g., cameras (for example, those running at a high frame rate akin to video), LiDAR, radar, ultrasonic sensors, microphones, etc.) and internal computer processing 125 to constantly determine where it can safely navigate, what other objects are around each robot, and what it may do within its immediate surroundings.

In some embodiments, the robots of the robot fleet further include conveyance system sensors 175 configured to: monitor drive mechanism performance (e.g., the propulsion engine); monitor power system levels 135 (e.g., battery, solar, gasoline, propane, etc.); or monitor drive train performance (e.g., transmission, tires, brakes, rotors, etc.).

Communications Module

Each robot in the fleet further includes a communication module 160 configurable to receive, store and send data to the fleet management module, to a user, to and from the fleet management module 120, and to and from the robots in the fleet 100. In some embodiments, the data is related to at least user interactions and the robot fleet interactions, including, for example, scheduled requests or orders, on-demand requests or orders, or a need for self-positioning of the robot fleet based on anticipated demand within the unstructured open or closed environments.

In some embodiments, each robot in the fleet includes at least one communication module configurable to receive, store and transmit data, and to store that data to a memory device, for future data transfer or manual download.

In some embodiments, each business 204 and customer 202 has their own app/interface to communicate with the fleet operator 200 (e.g., "Nuro customer app" for customers on their phone, "Nuro vendor app" for businesses on a tablet or phone or their internal computer system, etc.).

In some embodiments, the communication to the user and the robots in the fleet, between the robots of the fleet, and between the user and the robots in the fleet, occurs via wireless transmission.

In some embodiments, the user's wireless transmission interactions and the robot fleet wireless transmission interactions occur via mobile application transmitted by an electronic device and forwarded to the communication module via: a central server, a fleet management module, and/or a mesh network.

In some embodiments, one preferred method of communication is to use cellular communication between the fleet manager and fleet of robots, (e.g., 3G, 4G, 5G, or the like). Alternatively, the communication between the fleet control module and the robots could occur via satellite communication systems.

In some embodiments, a customer uses an app (either on a cellphone, laptop, tablet, computer or any interactive device) to request a service (e.g., an on-demand food order or for a mobile marketplace robot to come to them).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

In accordance with aspects of the present disclosure, the communication module 160 of each robot vehicle can be configured to communicate with a food delivery management system, which will be described in more detail in connection with FIGS. 15 and 16.

Goods and Services

In some embodiments, the user includes a fleet manager, a sub-contracting vendor, a service provider, a customer, a business entity, an individual, or a third party.

In some embodiments, the services include: subscription services, prescription services, marketing services, advertising services, notification services, or requested, ordered or scheduled delivery services. In particular embodiments, the scheduled delivery services include, by way of example, special repeat deliveries such as groceries, prescriptions, drinks, mail, documents, etc.

In some embodiments, the services further include: the user receiving and returning the same or similar goods within the same interaction (e.g., signed documents), the user receiving one set of goods and returning a different set of goods within the same interaction, (e.g., product replacement/returns, groceries, merchandise, books, recording, videos, movies, payment transactions, etc.), a third party user providing instruction and or authorization to a goods or service provider to prepare, transport, deliver and/or retrieve goods to a principle user in a different location.

In some embodiments, the services further include: advertising services, land survey services, patrol services, monitoring services, traffic survey services, signage and signal survey services, architectural building or road infrastructure survey services.

In some embodiments, at least one robot is further configured to process or manufacture goods.

In some embodiments, the processed or manufactured goods include: beverages, with or without condiments (such as coffee, tea, carbonated drinks, etc.); various fast foods; or microwavable foods.

In some embodiments, the robots within the fleet are equipped for financial transactions. These can be accomplished using known transaction methods such as debit/credit card readers or the like.

In accordance with aspects of the present disclosure, the robot vehicles can be configured to carry food items, such as refrigerated or frozen food items, and to autonomously heat the food items en route to the delivery destinations. In this manner, food items delivered to a destination can be fresher and less susceptible to problems with existing heated delivery, such as dryness from overheating or sogginess from steam, among other problems. Embodiments of such robot vehicles are described in more detail in connection with FIGS. 13-15. When the robot vehicle fleet is configured as a roving fleet, such robot vehicles in accordance with the present disclosure can reduce the wait time from customer order to delivery, while at the same time providing fresher, heated food items.

Securable Compartments

Figure 2:
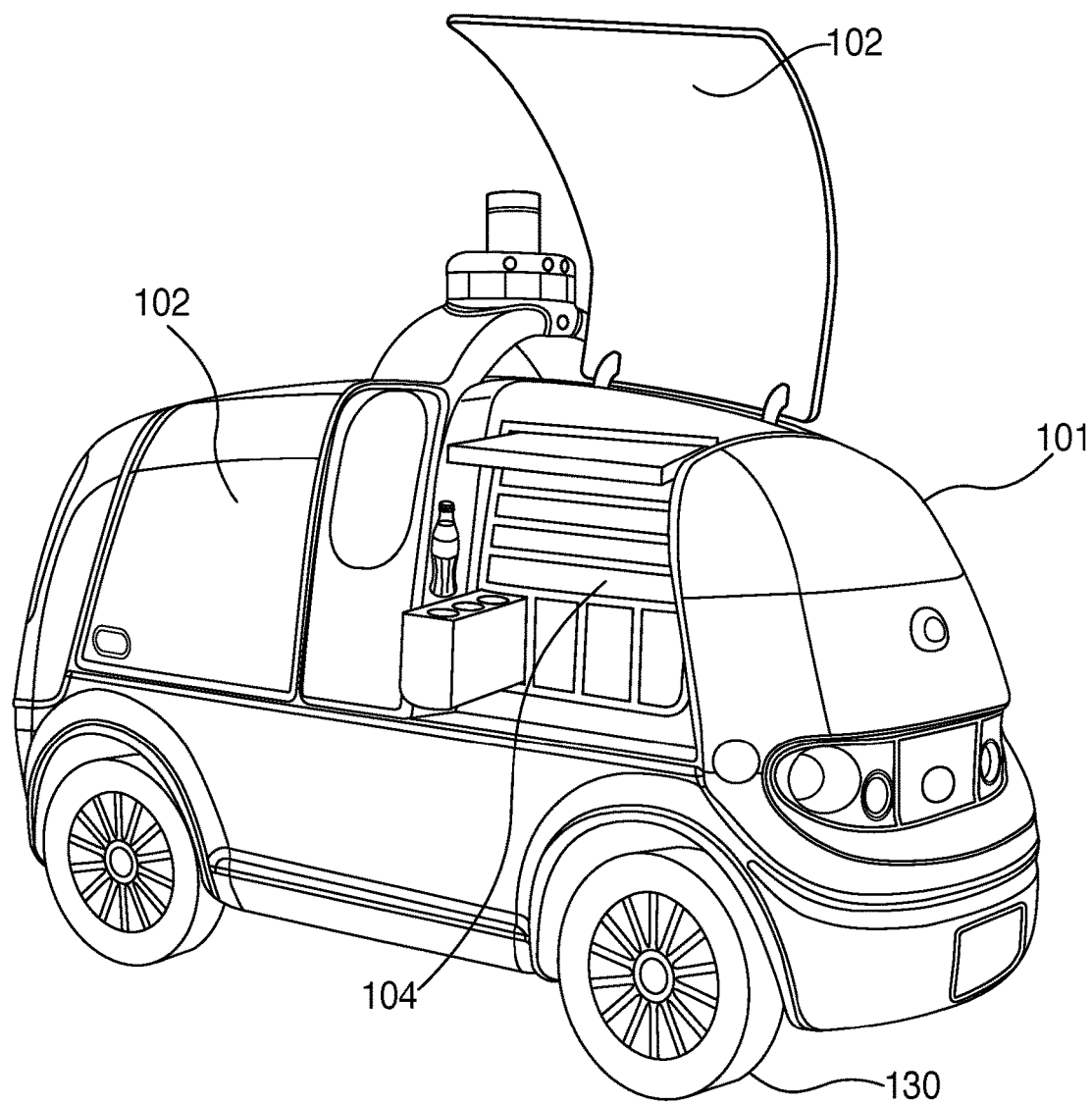
FIG. 2 is an exemplary ISO view of a robot vehicle, part of an autonomous robot fleet, illustrating securable compartments within the vehicle.
Figure 3:
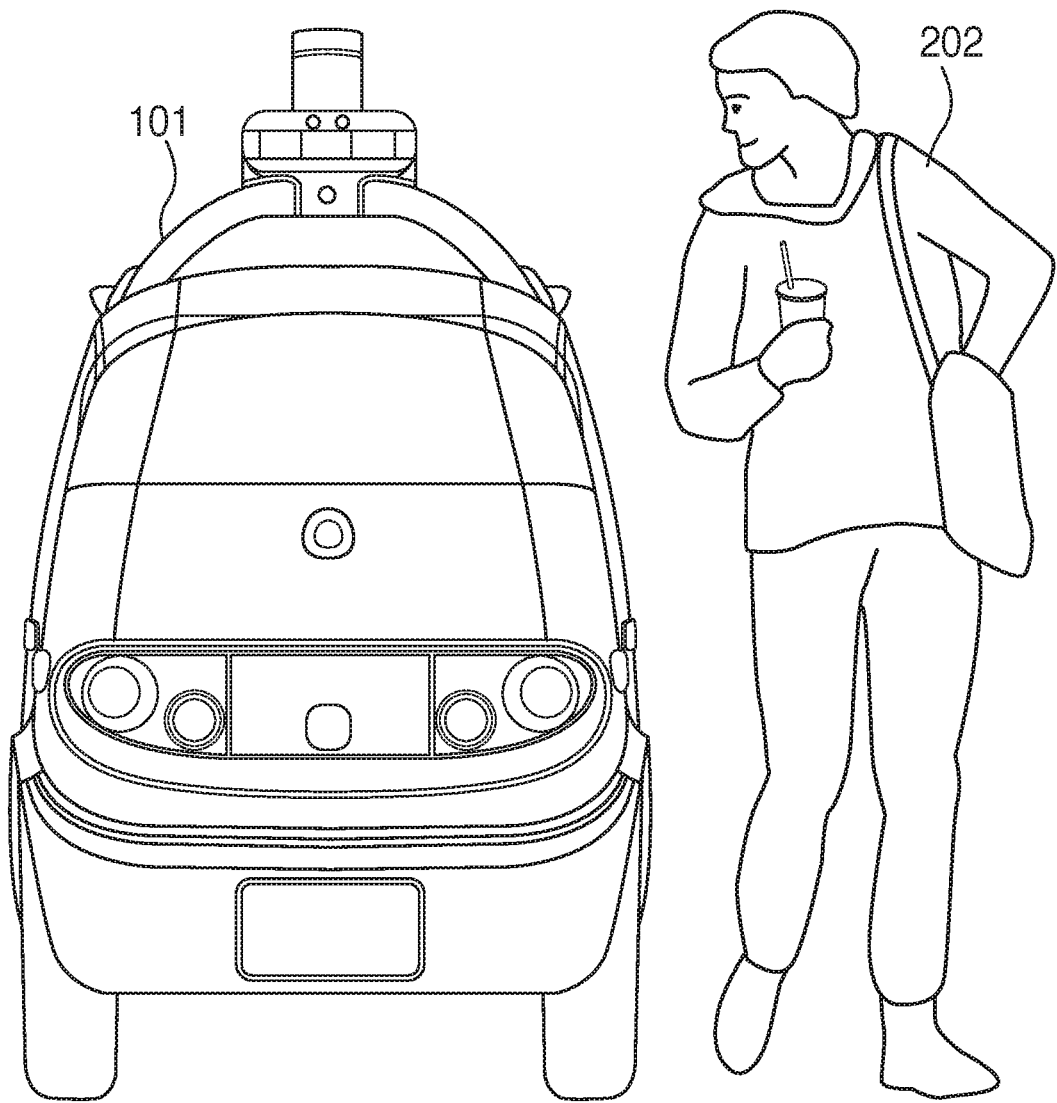
FIG. 3 is an exemplary front view of a robot vehicle, part of an autonomous robot fleet, shown in comparison to the height of an average person.
Figure 4:
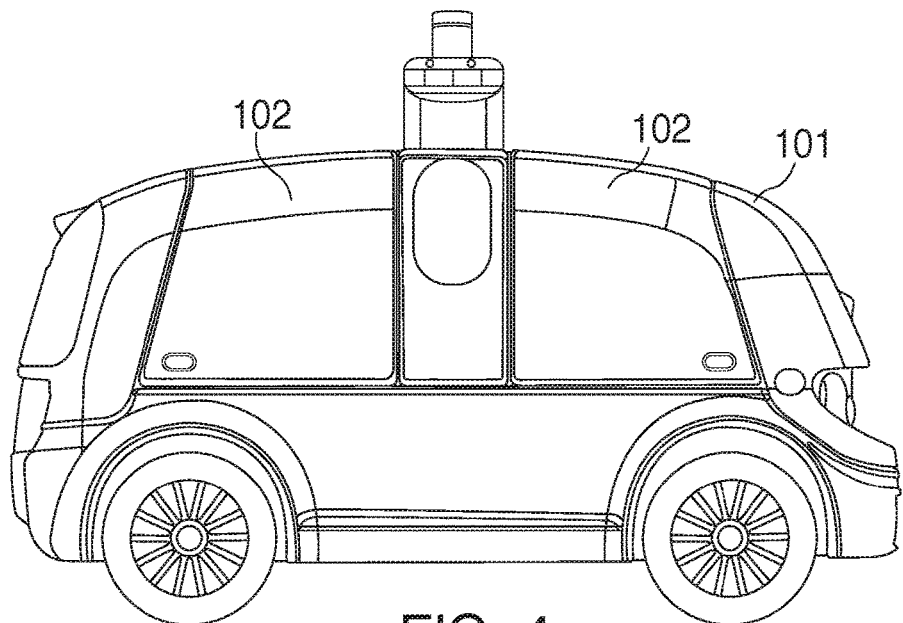
FIG. 4 is an exemplary right side view of a robot vehicle, part of an autonomous robot fleet, illustrating a configuration with two large side doors, each enclosing securable compartments.
Figure 5:
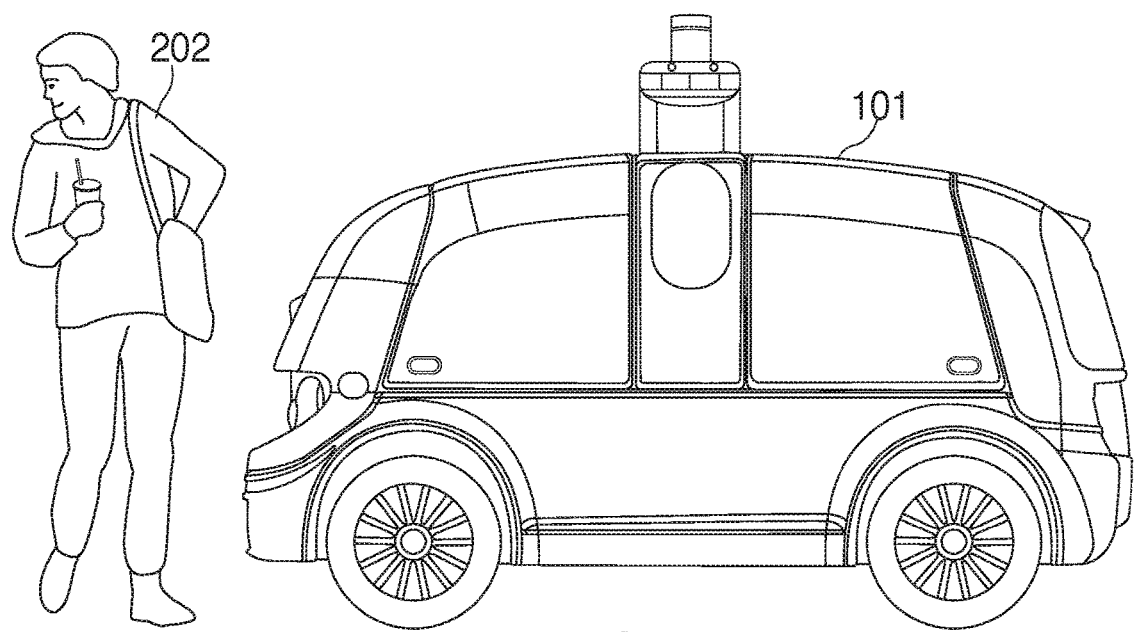
FIG. 5 is an exemplary left side view of a robot vehicle, part of an autonomous robot fleet, shown in comparison to the height of an average person.
Figure 6:
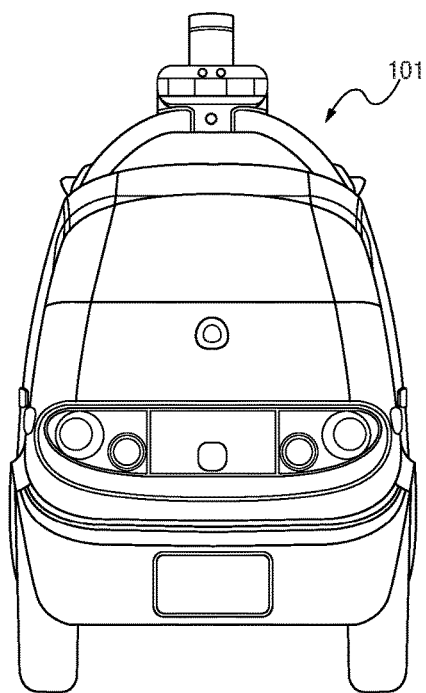
FIG. 6 is an exemplary rear view of a robot vehicle, part of an autonomous robot fleet.
Figure 7:
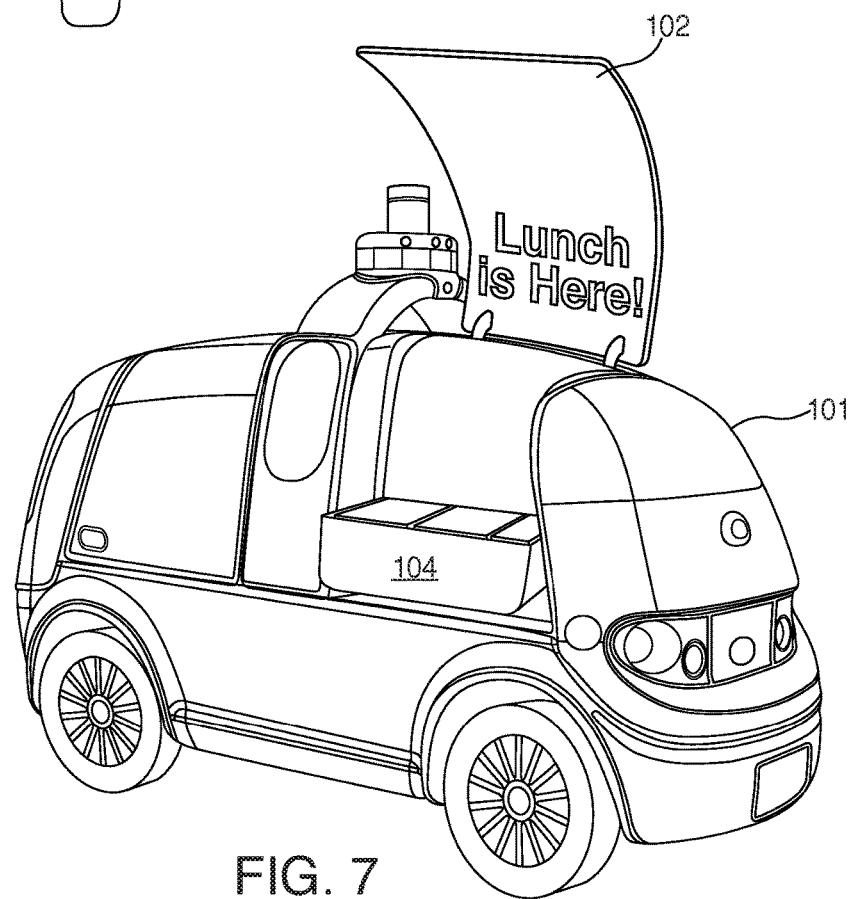
FIG. 7 is an exemplary ISO view of a robot vehicle, part of an autonomous robot fleet, illustrating an autonomous lunch delivery vehicle for any branded company.

As illustrated in FIG. 2, robots in the fleet are each configured for transporting, delivering or retrieving goods or services and are capable of operating in an unstructured open environment or closed environment. In some embodiments, the vehicle 101 is configured to travel practically anywhere that a small all-terrain vehicle could travel on land, while providing at least one and preferably two large storage compartments 102, and more preferably, at least one large compartment 102 is configured with smaller internal secure compartments 104 of variable configurations to carry individual items that are to be delivered to, or need to be retrieved from customers. The internal secure compartments 104 may also be referred to herein as sub-compartments. Additionally, within the context of descriptions relating to compartments and sub-compartments, the term "module" may be used herein to refer to a compartment and/or a sub-compartment.

Alternately, in some embodiments, the vehicle could be configured for water travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for hover travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for aerial drone or aerial hover travel, providing at least one and preferably two large storage compartments, and more preferably, at least one large compartment is configured with smaller internal secure compartments of variable configurations to carry individual items that are to be delivered to, or need to be retrieved from customers.

Figure 8:
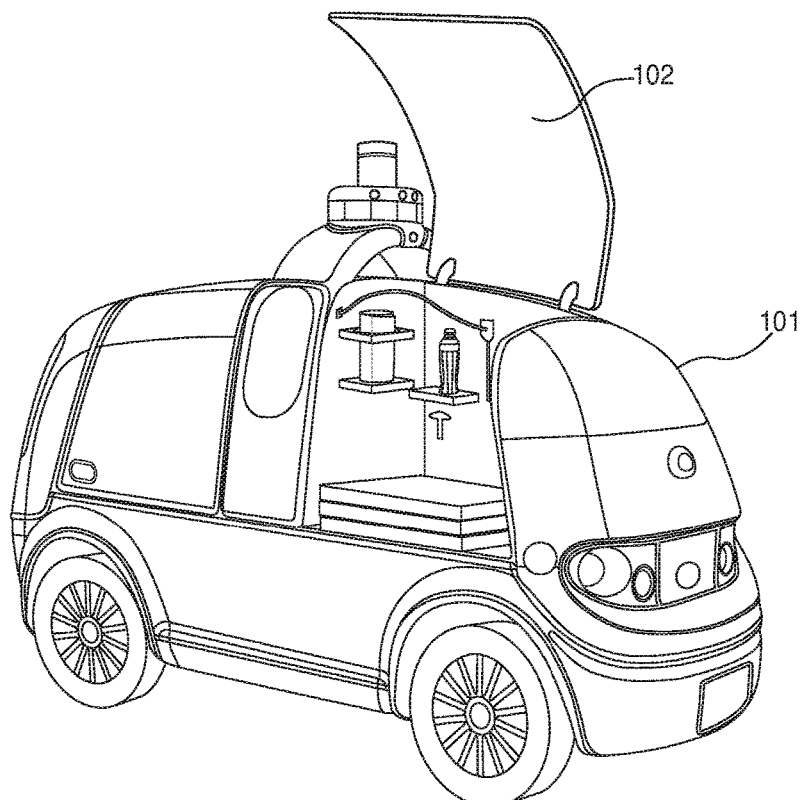
FIG. 8 is an exemplary ISO view of a robot vehicle, part of an autonomous robot fleet, illustrating an autonomous pizza delivery vehicle for any branded company.
Figure 9:
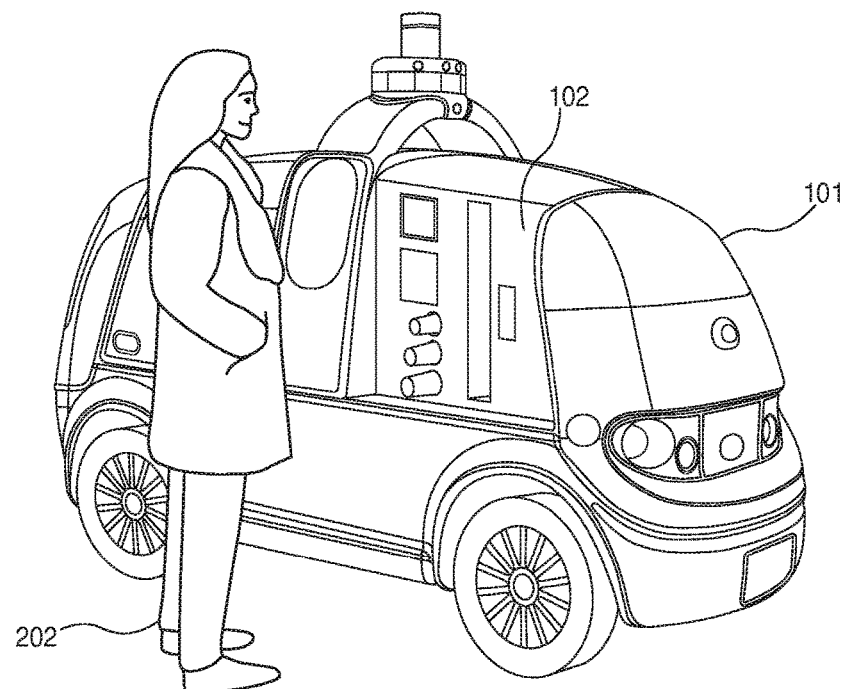
FIG. 9 is an exemplary ISO view of a robot vehicle, part of an autonomous robot fleet, illustrating an autonomous coffee delivery vehicle for any branded company.
Figure 10:
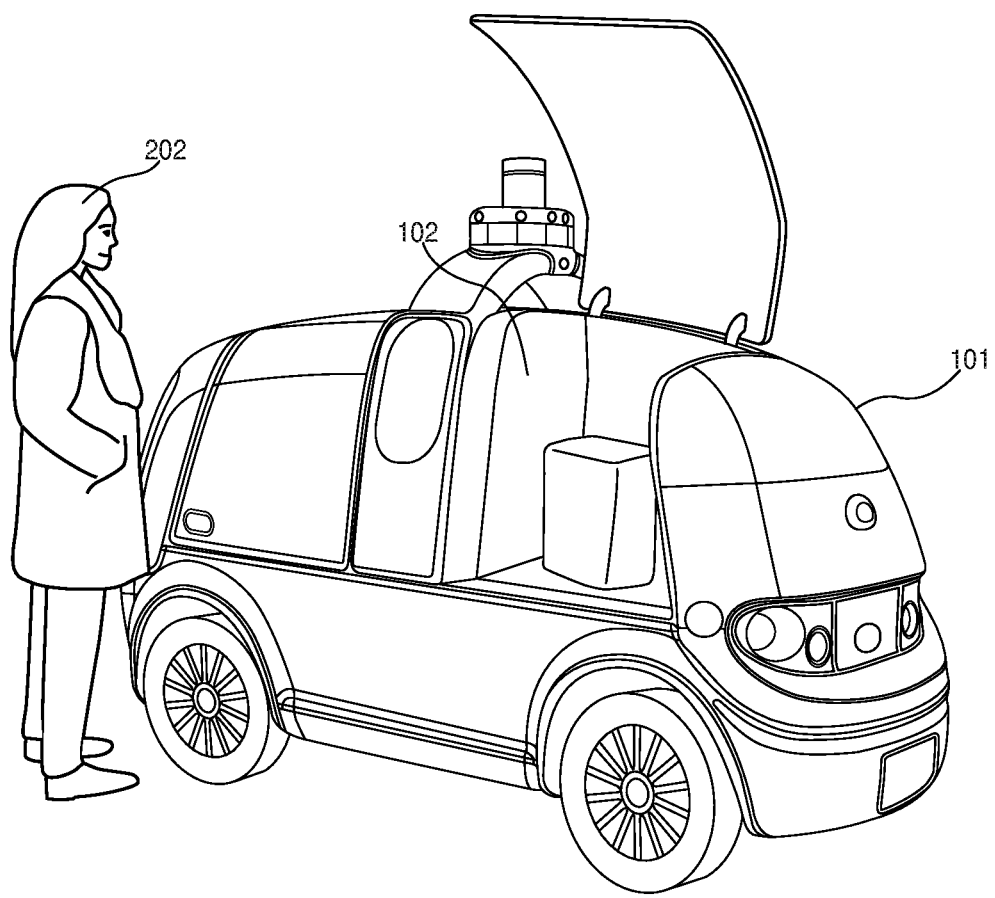
FIG. 10 is an exemplary ISO view of a robot vehicle, part of an autonomous robot fleet, illustrating an autonomous evening/nighttime delivery vehicle for any branded company, comprising a lighted interior.

As illustrated in FIGS. 7-10, in some embodiments, the securable compartments are humidity and temperature controlled for, for example, hot goods, cold goods, wet goods, dry goods, or combinations or variants thereof. Further still, as illustrated in FIGS. 8-10, the compartment(s) are configurable with various amenities, such as compartment lighting for night deliveries and condiment dispensers.

In some embodiments, the securable compartments are configurable for various goods. Such configurations and goods include: bookshelves for books, thin drawers for documents, larger box-like drawers for packages, and sized compartments for vending machines, coffee makers, pizza ovens and dispensers.

In some embodiments, the securable compartments are variably configurable based on: anticipated demands, patterns of behaviors, area of service, or types of goods to be transported.

Further still, each robot includes securable compartments to hold said goods or items associated with said services, and a controller 150 configurable to associate each one of the securable compartments 102, 104 to an assignable customer 202 or provider 204 and provide entry when authorized. Each robot vehicle further includes at least one processor configured to manage the conveyance system, the navigation module, the sensor system, instructions from the fleet management module, the communication module, and the controller.

As described previously, each robot is configured with securable compartments. Alternately, a robot is configurable to contain a set of goods or even a mobile marketplace (similar to a mini bar at a hotel).

When a robot is assigned to a customer 202, one or more of the compartments 102, 104 is also assigned to that customer. Each of the large compartments 12 is secured separately and can securely transport goods to a separate set of customers 202.

Upon arrival of the robot to the customer destination, the customer can then open their respective compartment(s) by verifying their identity with the robot. This can be done through a wide variety of approaches comprising, but not limited to:
1. The customers can be given a PIN (e.g., 4 digit number) when they make their initial request/order. They can then enter this pin at the robot using the robot touchscreen or a keypad.
2. The customers can verify themselves using their mobile phone and an RFID reader on the robot.
3. The customers can verify themselves using their voice and a personal keyword or key phrase they speak to the robot.
4. The customers can verify themselves through their face, a government ID, or a business ID badge using cameras and facial recognition or magnetic readers on the robot.
5. The customers can verify themselves using their mobile phone; by pushing a button or predetermined code on their phone (and the system could optionally detect the customer is near the robot by using their GPS position from phone)

In accordance with aspects of the present disclosure, the robot vehicles can be configured to carry food items and to autonomously prepare the food items en route to the delivery destinations. In accordance with aspects of the present disclosure, the robot vehicles can be configured to carry food items, such as refrigerated or frozen food items, and to autonomously heat the food items en route to the delivery destinations. In various embodiments, the robot vehicle includes a storage compartment or sub-compartment, such as a refrigeration compartment or sub-compartment, a freezer compartment or sub-compartment, and/or a temperature controlled storage compartment or sub-compartment. For ease of explanation below, a compartment or sub-compartment will be referred to as a module.

Figure 13:
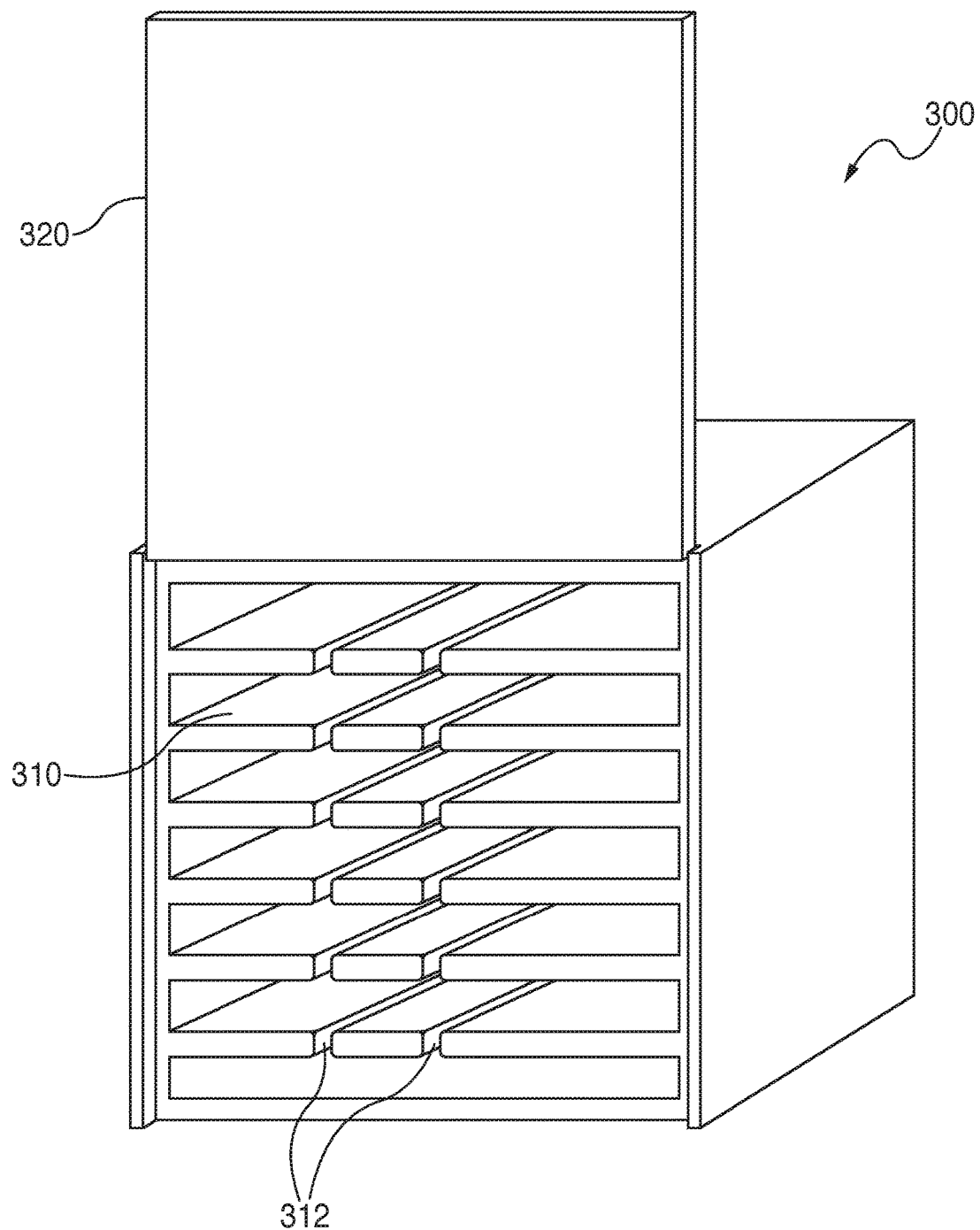
FIG. 13 is a diagram of an exemplary refrigeration or freezer compartment.

FIG. 13 shows one embodiment of a refrigeration module or freezer module or temperature controlled module 300 that is configured to hold pizzas. Each level 310 of the module 300 can be sized to hold one pizza pie, for example, such that the illustrated module 300 can hold six pizza pies. The module 300 can include a sliding door 320 that opens and closes the module 300. FIG. 13 shows the sliding door 320 in an open position. When the sliding door 320 is the open position, the pizzas within the module 300 are accessible and can be removed from the module 300. In various embodiments, the module is configured to cool to a temperature below 40 degrees Fahrenheit. FIG. 13 is merely illustrative of a refrigeration or freezer or temperature controlled module and does not limit the scope of the present disclosure. Other types and configurations of a refrigeration or freezer or temperature controlled module are contemplated for storing various types of food items, such as hot dogs or container beverages, or various types of pre-packaged food items and/or frozen food items. Additionally, various components of the refrigeration or freezer module are not shown, such as a compressor or fan or another part, but such components will be understood by persons skilled in the art.

Figure 14:
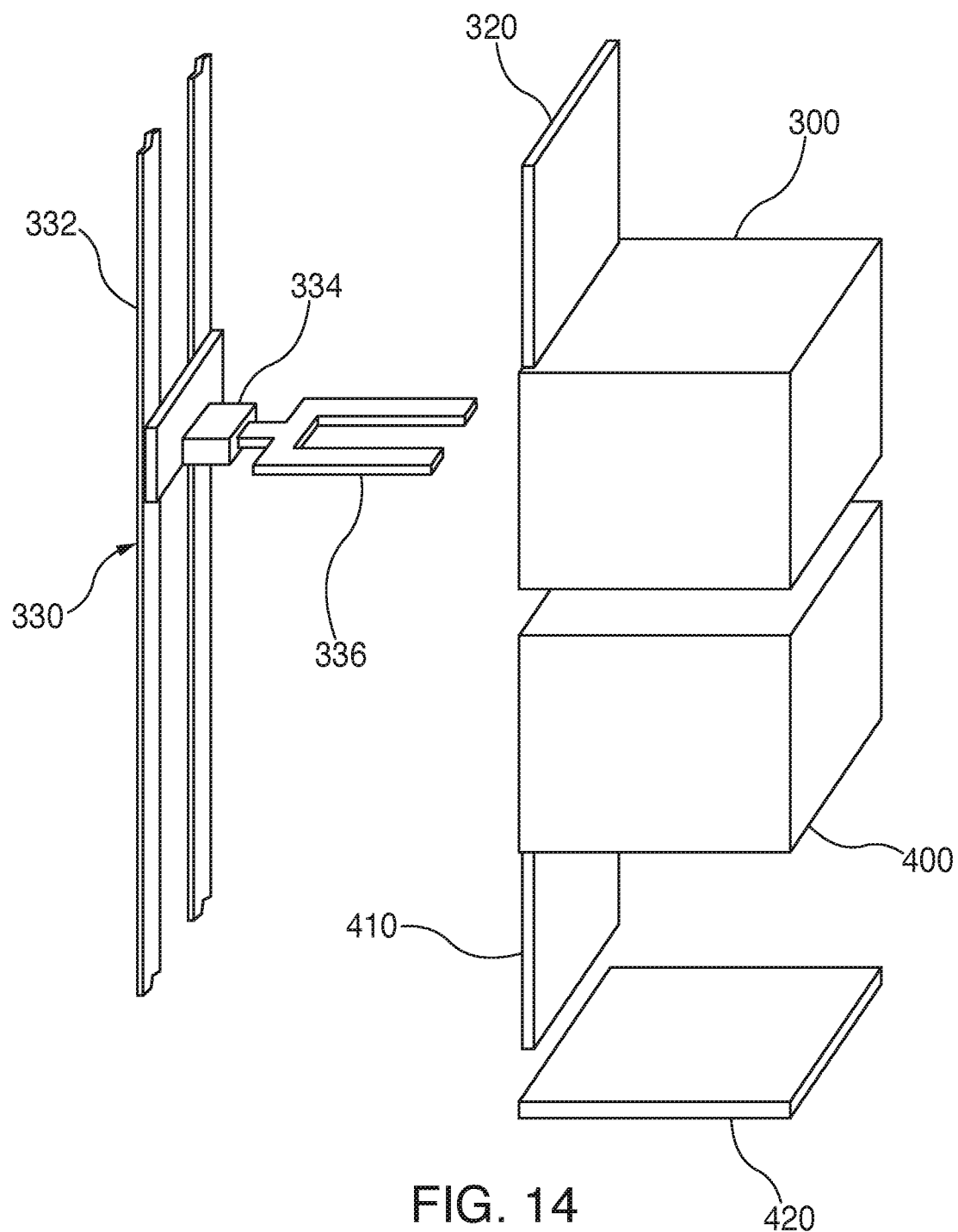
FIG. 14 is a diagram of an exemplary configuration that includes a freezer or refrigeration compartment, a heating compartment, and a conveyor.

FIG. 14 shows a diagram of an exemplary conveyor 330 that can operate to remove a pizza from the refrigeration or freezer module 300 and convey the pizza to a heating module 400. In the illustrated embodiment, the conveyer 330 can move vertically on a track 332 and can extend horizontally from a telescoping arm 334. The prongs 336 at the end of the conveyor 330 can fit between the gaps (312, FIG. 13) in each level of the refrigeration or freezer module 300 to lift a pizza out of the module 300. In the illustrated embodiment, a heating module 400, such as an oven or a microwave, can be located below the refrigeration/freezer module 300. The heating module 400 can also have a sliding door 410 that opens or closes the heating module 400. In various embodiments, the doors 320, 410 of the refrigeration/freezer module and the heating module can be controlled to not be both open at the same time. When the door 410 of the heating module 400 is open, the conveyor 330 can move the pizza into the heating module 400, and then the door 410 of the heating module 400 can close. In various embodiments, the heating module 400 can include multiple levels and can heat multiple food items at the same time. When the heating module 400 completes the heating of the pizza, the conveyor 330 can remove the pizza from the heating module 400 and move it to a packaging container 420. In various embodiments, the packaging container 420 can be located in a compartment of the robot vehicle that a user can access with a PIN or in another way, as described above herein. Various components of the heating module are not shown, such as a heating element and fuel/power connections, but such components will be understood by persons skilled in the art.

FIG. 14 is merely illustrative and other embodiments are contemplated to be within the scope of the present disclosure. For example, the shape and construction of the conveyor 330 are merely exemplary, and other shapes and mechanism are contemplated for other types of food items, such as hot dogs, pastries, or various types of pre-packaged or pre-arranged food items. Additionally, the particular arrangement of the refrigeration/freezer module 300 and the heating module 400 is exemplary and does not limit the scope of the present disclosure. Other positions are contemplated depending on the type of food items to be handled. Other types and configurations of a heating module are contemplated. In various embodiments, the heating module may not be an oven and can be a toaster, a toaster oven, a broiler, an air fryer, a microwave, a griddle, a grill, a kettle, or a coffee maker, among other things. In various embodiments, a robot vehicle can include multiple heating modules of the same type or of different types (not shown) and can heat multiple food items at the same time.

In various embodiments, the system of FIG. 14 can prepare and heat pastries. For example, the module 300 may be a storage module that may or may not be cooled by refrigeration and may not be temperature controlled. The module 300 can store pastries in a preconfigured layout. The conveyor 330 may be a robotic spatula or gripper that accesses the layout to remove the pastries and move them to the heating module 400. In various embodiments, the heating module 400 can be an oven, a toaster, a toaster oven, or a microwave that heats the pastries. In various embodiments, the heating module 400 can be another type of heating device that heats pastries. After the heating module 400 completes the heating of the pastry, the conveyor 330 can remove the pastry from the heating module 400 and move it to a packaging container 420. The packaging container 420 can be sized and configured to hold a pastry.

In various embodiments, the system of FIG. 14 can prepare and heat frozen food items. For example, the module 300 may be a freezer module that stores frozen food items in a preconfigured layout. The conveyor 330 may be a robotic spatula or gripper or other robotic conveyor that accesses the layout to remove the frozen food items and move them to the heating module 400. In various embodiments, the heating module 400 can be a microwave that heats the frozen food. In various embodiments, the heating module 400 can be another type of heating device that heats frozen food items. After the heating module 400 completes the heating of the food items, the conveyor 330 can remove the food item from the heating module 400 and move it to a packaging container 420. The packaging container 420 can be sized and configured to hold the food item.

Figure 15:
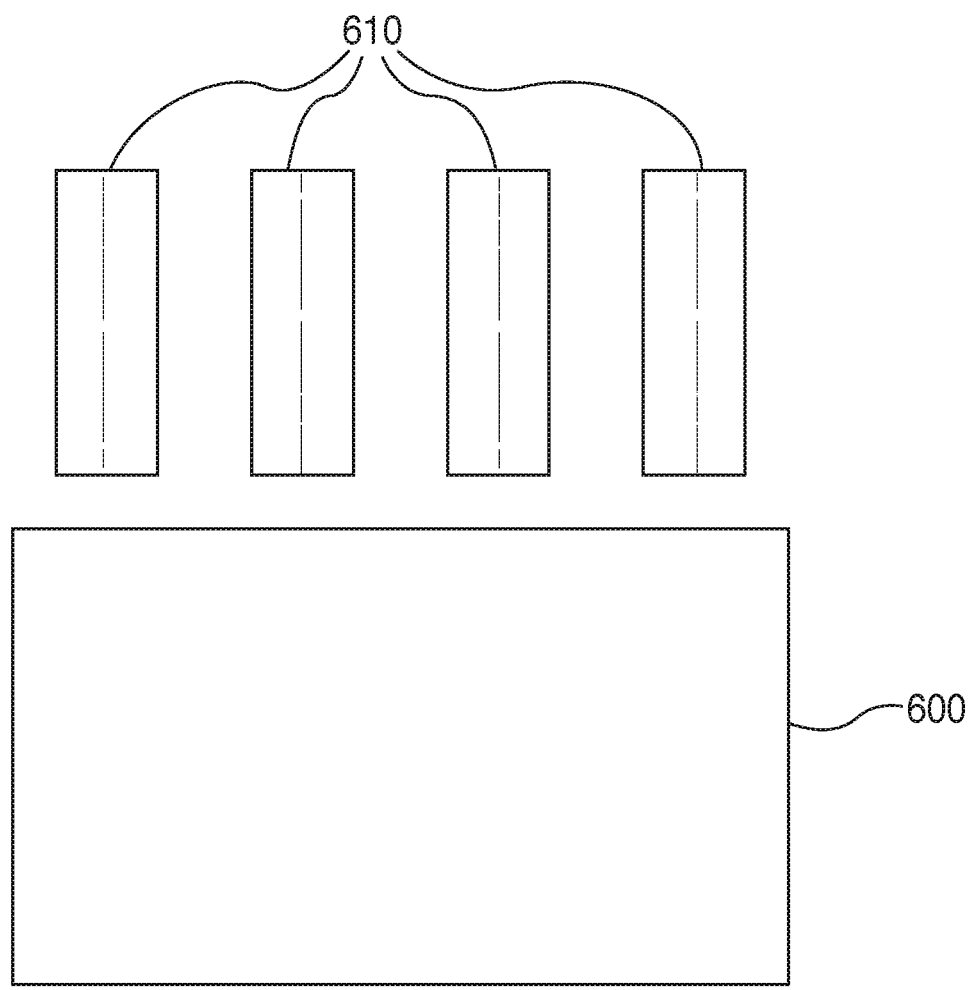
FIG. 15 is a diagram of an exemplary configuration that includes a mixer and ingredient dispensers.

Referring now to FIG. 15, there is shown one embodiment of a module 600 that is configured to mix ingredients. In various embodiments, the module 600 can be configured to create salad mixes. In various embodiments, the module 600 can be configured to create beverage mixes. In the illustrated embodiment, each ingredient can be stored in a separate dispenser 610. For example, in the case of a salad mix, the dispensers 610 can separately store and dispense salad greens, tomato, meat, and salad dressing, among other things. The ingredients can be dispensed into the mixer 620, which can mix the ingredients in various ways. For example, the mixer 620 can mix the ingredients by vibrating the contents. In various embodiments, mixer 620 can contain a secured container (not shown), and the dispensers 610 can dispense the ingredients directly into the container. Then, the secured container can be closed during the mixing process such that the ingredients are mixed within the secured container. In the case of a beverage mix, such as an ice cream float or other beverage mix, the dispensers 610 can hold the ingredients and dispense them into the mixer 620 or into a secured container within the mixer 620. The mixer 620 can spin, for example, to mix the ingredients within the secured container. The embodiment of FIG. 15 is exemplary, and variations are contemplated to be within the scope of the present disclosure. For example, other arrangements, sizes, and configurations of dispensers, mixers, and/or secured containers are contemplated. Additionally, various components of the dispensers and mixers are not shown, but such components will be understood by persons skilled in the art.

Figure 16:
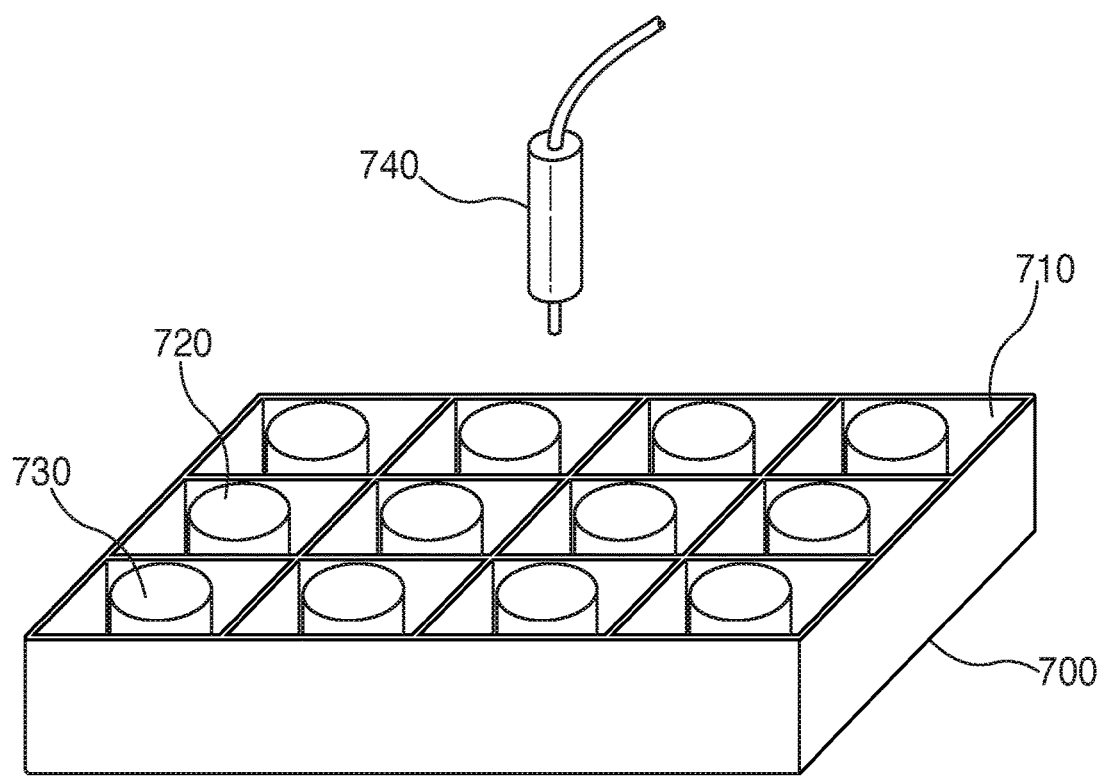
FIG. 16 is a diagram of an exemplary configuration that includes a liquid dispenser and sub-compartments having containers.

Referring now to FIG. 16, there is shown one embodiment of a module 700 that is configured to add water to and/or boil food items or beverages. In various embodiments, the module 700 can be configured to prepare and heat instant noodles, rice, and/or pasta, among other things, and/or configured to dispense coffee or other beverages. In various embodiments, the module 700 can be configured with separate sub-compartments 710. Some or all sub-compartment can include a pre-packaged food item 720, such as a cup of instant noodle, rice, pasta, instant coffee, or teabags, among other things. A movable dispenser 740 can move to the location of the pre-packaged food item 720 and dispense water into the package 720. In various embodiments, the dispenser 740 can dispense hot water. In various embodiments, the dispenser 740 can dispense cold water, and the sub-compartment 710 can include a heating element, such as an electric coil. The pre-packaged container 720 can be made from a material that can be heated, such as metal. In various embodiments, a sub-compartment 710 can include a beverage container 730, and the dispenser 740 can dispense a beverage into the beverage container 730. For example, the dispenser 740 can dispense coffee, tea, juice, soda, or another beverage into the beverage container 730. The embodiment of FIG. 16 is exemplary, and variations are contemplated to be within the scope of the present disclosure. For example, other arrangements, sizes, and configurations of dispensers, sub-compartments, and/or containers are contemplated. Additionally, various components of the dispensers and modules are not shown, such as pumps or heating elements, but such components will be understood by persons skilled in the art.

The control and processing of food orders will be described below in connection with FIGS. 17 and 18.

Controller(s) and Processor(s)

In some embodiments, each robot in the robot fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each robot in the robot fleet is equipped with a controller 150 configurable to associate each one of the securable compartments 102, 104 to an assignable customer 202 or provider 204 and provide entry when authorized.

The following will now describe control and processing in connection with managing delivery of food by autonomous vehicles, where the autonomous vehicles heat food items en route to a destination.

Figure 17:
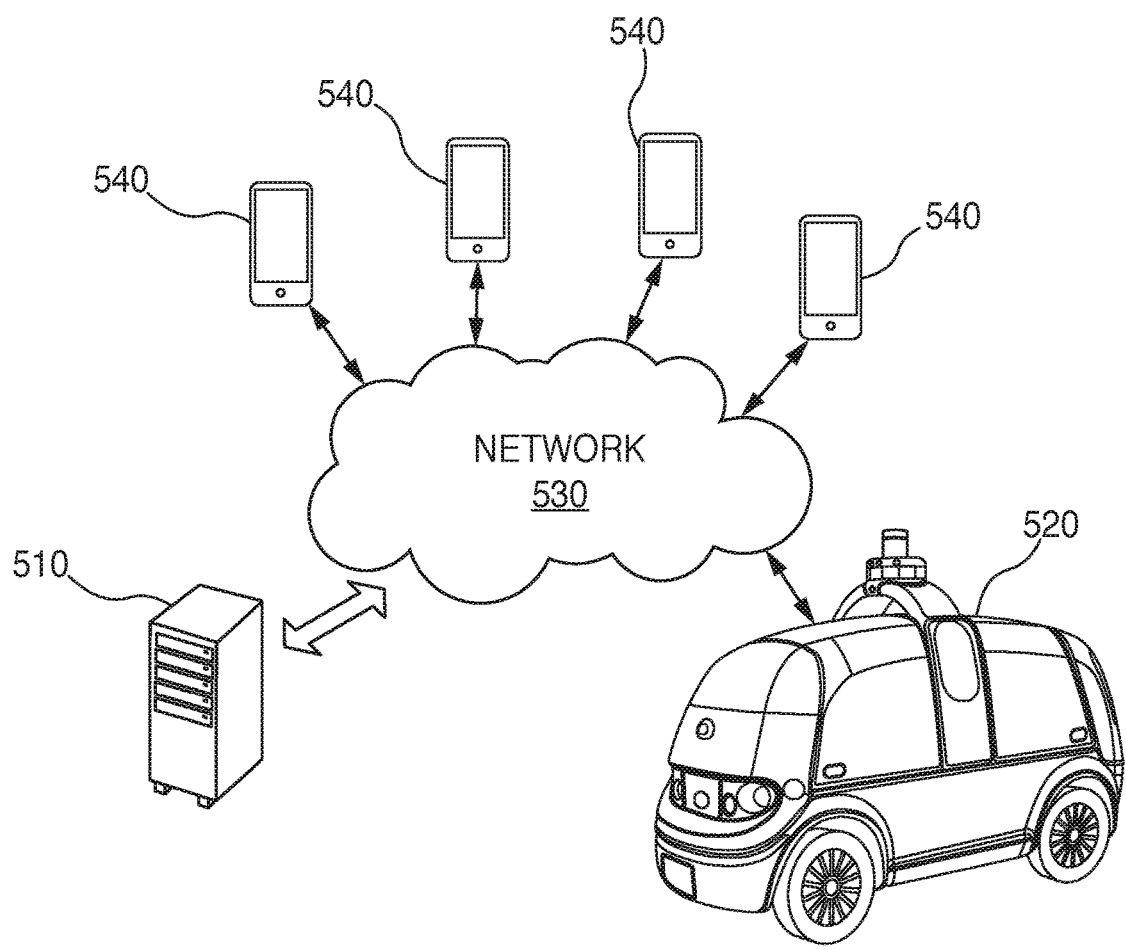
FIG. 17 is a diagram of an exemplary networked environment.

In accordance with aspects of the present disclosure, and with reference to FIG. 17, a food delivery management system 510 is provided that receives Internet food orders and communicates the food orders to autonomous robot vehicles 520 for delivery of food items to delivery destinations. The food delivery management system 510 can include one or more servers that are in communication with a network 530, which can include any network technology described herein or not described herein, including a cellular data network, a wired network, a fiber optic network, a satellite network, and/or an IEEE 802.11a/b/g/n/ac wireless network, among others. Customer devices 540 can communicate with the food delivery management server 510 through the network 530. A customer device 540 can be any electronic device described herein or not described herein, including smartphones, tablets, laptops, desktop computers, set-top boxes, smart watches, or another device. The customer maybe a direct customer such as an individual consumer or may be a food provider such as a Pizzeria.

In accordance with one aspect of the present technology, the customer devices 540 can use software applications to communicate with the food delivery management system 510. In various embodiments, the software application can be a mobile app, a web browser that loads a particular URL, or a standalone computer application, among other things. The software application can include a menu of food items that can be heated en route during delivery (not shown), and can permit a food order to be completed specifying desired food items and a delivery destination. In various embodiments, the food order can include additional items such as coffee or a container beverage. The software application on the customer devices communicates the food order to the food delivery management server 510, which receives the food order and communicates it to one or more autonomous vehicles 520.

Figure 18:
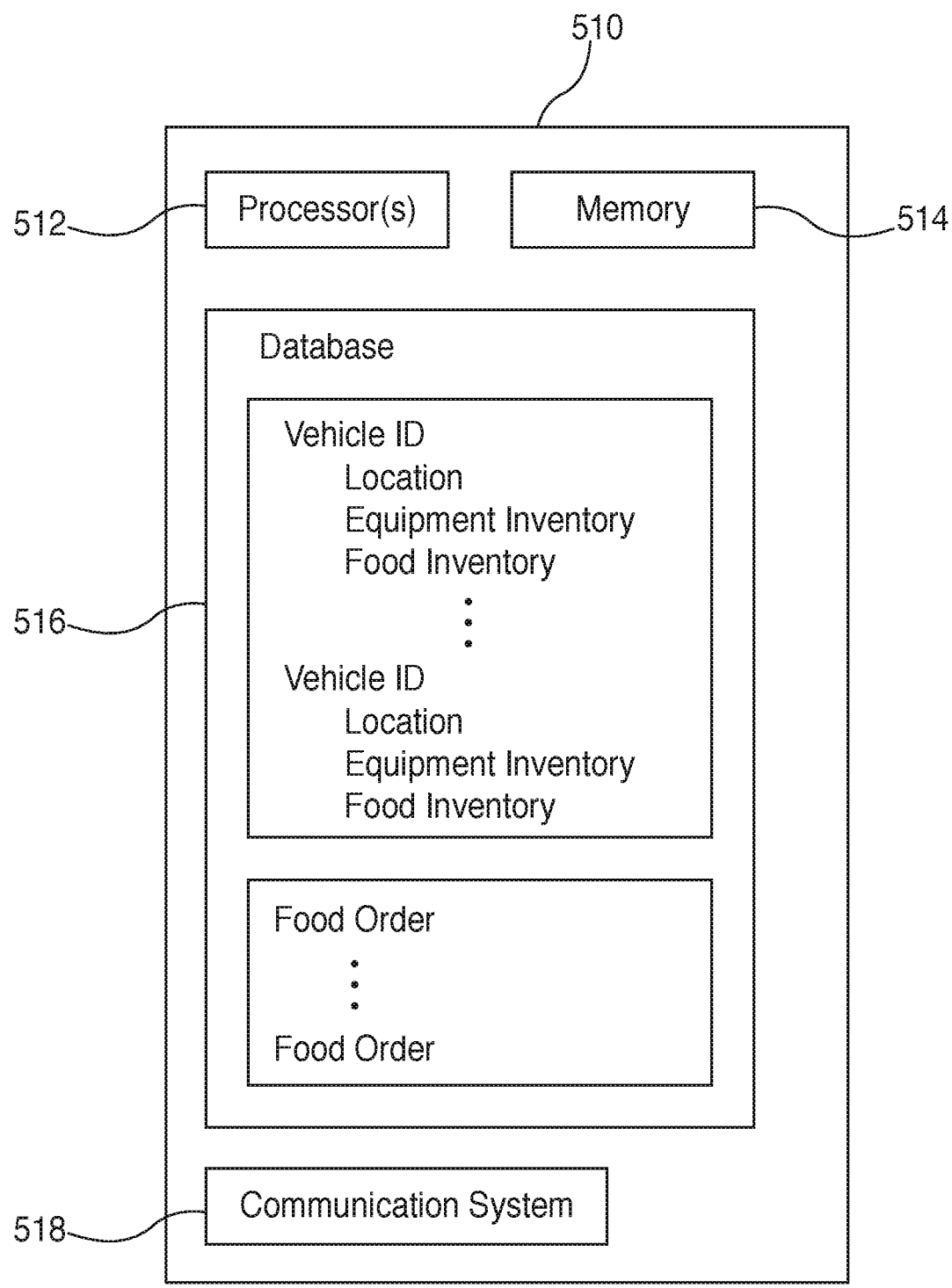
FIG. 18 is a block diagram of exemplary components of a food delivery management server.

Referring also to FIG. 18, there is shown a block diagram of exemplary components of the food delivery management server 510, including one or more processor(s) 512, one or more memory 514, a database 516, and a communication system 518. The memory 514 can store instructions for execution by the processor(s) 512 to carry out the operations described herein. The communication system 518 can operate to receive orders from software applications and can communicate with the autonomous robot vehicles 520. The database 516 can store the food orders and can also store information for each of the autonomous robot vehicles 520, including, for example, vehicle ID, equipment inventory, and food inventory for the vehicle. Different vehicles 520 may have different equipment and food offerings. For example, one vehicle may include equipment such as a freezer module, an oven module, and a beverage dispenser, and may include food such as pizza and container beverages. Another vehicle may include equipment such as a coffee maker and a microwave, and may include food such as microwave breakfast sandwiches. This information is stored in the database 516 of the food delivery management system 510. The database 516 can also store the location of each autonomous robot vehicle 520. As described above herein, each vehicle 520 can include GPS navigation capability. The autonomous robot vehicles 520 can communicate their locations to the food management delivery system 510, which can store the location information in the database 516. The listing of database information in FIG. 18 is exemplary, and other information regarding food orders or autonomous vehicles can be stored in the database 516.

With continuing reference to FIG. 18, when the food delivery management system 510 receives a food order, the system 510 determines which autonomous vehicles 520 may be capable of fulfilling the order. In particular, in accordance with aspects of the present disclosure, the food order can specify food items to be heated en route during delivery. The food delivery management system 510 can access the database 516 to access the equipment inventory and food inventory for the autonomous vehicles 520, and to determine which vehicles 520 include the ordered food item and the equipment for heating the food item. In various embodiments, the food delivery management system 510 can additionally access the location of each vehicle 520.

In various embodiments, the food delivery management system 510 can communicate the food order to one or more of the eligible vehicles 520 that include the food item the necessary heating module. In various embodiments, the food delivery management system 510 can assign the food order to the eligible vehicle 520 that is closest to the delivery destination. In various embodiments, the food delivery management system 510 can assign the food order to the eligible vehicle 520 that has the fewest number of food orders. In various embodiments, the food delivery management system 510 can assign the food order to the eligible vehicle 520 that has the optimal balance of distance and number of food orders for delivery. In various embodiments, the food delivery management system 510 can communicate the food order to one or more eligible vehicles 520, and each eligible vehicle 520 can either accept the order or reject the order. In various embodiments, the food delivery management system 510 can broadcast the food order to all eligible vehicles 520, and the eligible vehicles 520 can respond with a "bid" for the food order, such that the vehicle 520 with the highest bid can be assigned the food order. In various embodiments, an autonomous robot vehicle 520 that is assigned a food order can respond to the food delivery management system 510 with a delivery time estimate for the food order, and the food delivery management system 510 can communicate the time estimate to the customer device 540. The various ways of assigning a food order to an autonomous vehicle are exemplary, and other ways of assigning a food order to an autonomous vehicle are contemplated.

In accordance with aspects of the present disclosure, the food delivery management system 510 can analyze historical food orders to identify food ordering patterns. For example, there may be recurring peak times when particular food orders are placed, such as coffee orders between 7:00 AM and 8:00 AM, or peak times when particular food orders are delivered to certain locations, such as pizza orders for delivery to a local high school between 11:30 AM and 12:30 PM. In various embodiments, the food delivery management system 510 can preemptively instruct one or more robot vehicles 520 to preemptively prepare food/beverage orders before the orders are actually placed by consumers. In various embodiments, the food delivery management system 510 can communicate actual food orders to the robot vehicles, with the food orders having no assigned customer. If a customer places a food order that has been preemptively assigned to a robot vehicle 520, the food delivery management system 510 can associate the customer with the preemptive food order and communicate the customer information to the robot vehicle 520. The disclosed embodiments are exemplary, and other variations and embodiments of implementing food order analytics and forecasts, and implementing preemptive food orders, are contemplated to be within the scope of the present disclosure.

In accordance with aspects of the present disclosure, and with reference to FIG. 12, the following will describe control and processing of an autonomous robot vehicle that receives a food order. As shown in FIG. 12, an autonomous robot vehicle includes a robot processor 125. The robot processor 125 executes instructions stored in a memory (not shown) to perform the operations described herein, including determining a travel route for delivering food orders, and scheduling food orders to particular preparation modules, among other things. In various embodiments, an autonomous robot vehicle that receives a food order for a delivery destination can use the navigation module 140 to determine a travel route that includes the destination. In various embodiments, the vehicle can evaluate different possible travel routes provided by the navigation module 140 and can select a travel route that provides sufficient time to heat the food item of the food order before reaching the delivery destination. For example, an autonomous vehicle may select a route that delivers a later food order first, to provide sufficient time to heat an earlier food order. Accordingly, the autonomous vehicle can schedule the food orders to the preparation module(s) based on the route selection. In various embodiments, an autonomous vehicle may include multiple preparation modules and may schedule multiple food orders to different preparation modules.

In various embodiments, the robot vehicle includes multiple preparation modules and has the capability to concurrently prepare food and/or beverages for multiple customers. In various embodiments, the processor 125 can schedule the preparation of food orders based on the estimated time to arrive at the customer location and/or based on the preparation time for each food order. If multiple preparation modules are available and the optimal scheduling indicates that more than one food order should be prepared concurrently, the processor 125 can schedule the food preparation accordingly.

With continuing reference to FIG. 12, after the processor 125 has selected a travel route, the processor 125 controls the conveyance system 130 to travel the travel route. During the travel, the processor 125 controls the securable compartments 102, 104 based on the schedule assigning food orders to preparation modules. The securable compartments 102, 104 can be any of the compartments or sub-compartments disclosed herein, such as the compartments or sub-compartments shown and described in FIGS. 2, 7-10, and 13-16. For example, while traveling the travel route, the processor 125 can control a conveyor (330, FIG. 14) to convey a food item from a storage module (such as a refrigeration/freezer module) 102, 104 to a preparation module, such as an oven module, and can control the preparation module to prepare the food item while travelling the travel route. When the autonomous vehicle reaches the delivery destination, a customer can retrieve the food order in the manners described above herein.

In various embodiments, the processor 125 can control the conveyance system 130 based on various parameters. In various embodiments, if travel time is less than food preparation time, the processor 125 can control the vehicle to delay its arrival at the customer location by, for example, parking on street-side parking for a period of time or circling around a neighborhood for a period of time until the food preparation is completed or is close to being completed. In such embodiments, the processor 125 can control the preparation modules to begin food preparation as soon as a module is available. In various embodiments, if travel time is greater than food preparation time, the processor 125 can control the preparation modules to delay food preparation until the robot vehicle is closer to the customer location. In such embodiments, the processor 125 an control the preparation modules to begin preparing food when the remaining time to reach the destination is longer than the time to prepare the food by a predetermined threshold. For example, the predetermined threshold can be a duration (e.g., remaining travel time is five minutes longer than food preparation time), or can be a percentage (e.g., remaining travel time is 110% of food preparation time), or can be another threshold. In various embodiments, even if travel time is greater than food preparation time, the processor 125 can still control the preparation modules to begin food preparation early and then keep the food at the proper temperature by controlling the temperature of the preparation modules.

Additional Features

In some embodiments, the robot fleet further includes at least one robot having a digital display for curated content comprising: advertisements (i.e., for both specific user and general public), including services provided, marketing/promotion, regional/location of areas served, customer details, local environment, lost, sought or detected people, public service announcements, date, time, or weather.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An autonomous robot vehicle comprising:
a conveyance system;

a navigation system configured to navigate to destinations;

a communication system configured to communicate with a food delivery management system;

at least one storage module including at least one of: a storage compartment or a storage sub-compartment configured to store food items;

at least one preparation module including at least one of: a preparation compartment or a preparation sub-compartment configured to prepare the food items;

at least one processor; and a memory storing instructions which, when executed by the at least one processor, cause the autonomous robot vehicle to, autonomously:

receive, via the communication system, a food order for a destination;

determine, via the navigation system, a travel route that includes the destination;

control the conveyance system to travel the travel route to reach the destination; and prepare, via the at least one preparation module, a food item corresponding to the food order while traveling on the travel route, wherein the at least one storage module includes a plurality of ingredients and the at least one preparation module includes a mixer configured to mix the ingredients.

2. The autonomous robot vehicle of claim 1, wherein the plurality of ingredients include salad ingredients, wherein the instructions, when executed by the at least one processor, cause the mixer to mix the salad ingredients to prepare a salad food order.

3. The autonomous robot vehicle of claim 1, wherein the plurality of ingredients include beverage ingredients, wherein the instructions, when executed by the at least one processor, cause the mixer to mix the beverage ingredients to prepare a mixed beverage food order.

4. The autonomous robot vehicle of claim 1, wherein the at least one preparation module includes at least one container and the at least one storage module includes a dispenser, wherein the instructions, when executed by the at least one processor, cause the dispenser to dispense liquid into the at least one container.

5. The autonomous robot vehicle of claim 4, wherein the at least one container includes at least one of pasta, rice, or instant noodles, and wherein the dispenser is configured to dispense water into the at least one container.

6. The autonomous robot vehicle of claim 4, wherein the at least one preparation module further includes a heating element configured to heat the at least one container.

7. The autonomous robot vehicle of claim 4, wherein the dispenser is configured to dispense at least one of coffee or tea, into the at least one container.

8. The autonomous robot vehicle of claim 1, wherein in determining the travel route that includes the destination, the instructions, when executed by the at least one processor, cause the autonomous robot vehicle to:

evaluate a plurality of possible travel routes having different travel times to reach the destination, the plurality of travel routes provided by the navigation system; and select one of the plurality of possible travel routes as the travel route based on a travel time sufficient to prepare the food item prior to reaching the destination.

9. The autonomous robot vehicle of claim 8, wherein, in selecting one of the plurality of possible travel routes, the instructions, when executed by the at least one processor, cause the autonomous robot vehicle to:

select the travel route in which a time to prepare the food item is longer than the travel time to reach the destination; and determine that travel to the destination will need to be delayed by performing at least one of: parking for a period of time or circling for a period of time.

10. The autonomous robot vehicle of claim 9, wherein in preparing the food item while traveling on the travel route, the instructions, when executed by the at least one processor, cause the autonomous robot vehicle to begin preparing the food item as soon as one of the at least one preparation module is available.

11. The autonomous robot vehicle of claim 8, wherein, in selecting one of the plurality of possible travel routes, the instructions, when executed by the at least one processor, cause the autonomous robot vehicle to:

select the travel route in which a time to prepare the food item is shorter than the travel time to reach the destination, wherein preparing the food item while traveling on the travel route includes delaying the preparation of the food item.

12. The autonomous robot vehicle of claim 11, wherein, in preparing the food item while traveling on the travel route, the instructions, when executed by the at least one processor, cause the autonomous robot vehicle to begin preparing the food item when remaining travel time to reach the destination is longer than the time to prepare the food item by a predetermined threshold.

13. The autonomous robot vehicle of claim 1, wherein the at least one preparation module includes a plurality of preparation modules, wherein the instructions, when executed by the at least one processor, further cause the autonomous robot vehicle to:

receive, via the communication system, a plurality of additional food orders; and scheduling the food order and the plurality of additional food orders to the plurality of preparation modules for concurrently preparing at least two food orders.

14. An autonomous robot vehicle comprising:

a conveyance system;

a navigation system configured to navigate to destinations;

a communication system configured to communicate with a food delivery management system;

at least one storage module including at least one of: a storage compartment or a storage sub-compartment configured to store food items;

at least one preparation module including at least one of: a preparation compartment or a preparation sub-compartment configured to prepare the food items;

at least one processor; and a memory storing instructions which, when executed by the at least one processor, cause the autonomous robot vehicle to, autonomously:

receive, via the communication system, a food order for a destination;

determine, via the navigation system, a travel route that includes the destination;

control the conveyance system to travel the travel route to reach the destination; and prepare, via the at least one preparation module, a food item corresponding to the food order while traveling on the travel route, wherein the at least one preparation module includes at least one of: a toaster, a toaster oven, a broiler, an air fryer, a microwave, an oven, a griddle, a grill, a kettle, or a coffee maker, and wherein the food items include frozen food, the at least one storage module includes at least one of: a temperature controlled storage compartment or a temperature controlled storage sub-compartment, and the at least one preparation module includes the microwave.

15. The autonomous robot vehicle of claim 14, wherein the food items include at least one of pizza or pastries, and the at least one preparation module includes at least one of the oven, the toaster oven, or the broiler.

16. A system for managing a fleet of autonomous robot vehicles for food delivery, the system comprising:
  a communication system configured to communicate with each autonomous robot vehicle of a fleet of autonomous robot vehicles and to receive food orders from software applications on customer devices;
  a database configured to store information for each autonomous robot vehicle of the fleet, the information including equipment inventory and food inventory for each autonomous robot vehicle;
  at least one processor; and
  a memory storing instructions which, when executed by the at least one processor, cause the system to:
    receive a food order from a software application on a customer device, the food order being an order for food to be prepared en route to a delivery destination;
    identify, based on the equipment inventory and food inventory information in the database, particular autonomous robot vehicles in the fleet capable of fulfilling the food order; and
    communicate, via the communication system, with at least one of the particular autonomous robot vehicles regarding the food order.

17. The system of claim 16, wherein the equipment inventory information indicates whether each autonomous robot vehicle includes at least one of: a temperature controlled storage compartment or a temperature controlled storage sub-compartment.

18. The system of claim 16, wherein the equipment inventory information indicates whether each autonomous robot vehicle includes at least one of: a toaster, a toaster oven, a broiler, an air fryer, a microwave, an oven, a griddle, a grill, a kettle, or a coffee maker.

19. The system of claim 16, wherein the food inventory information indicates whether each autonomous robot vehicle includes at least one of: pizzas, pastries, frozen foods, salads, mixed beverages, coffee, tea, pasta, rice, or instant noodles.

20. The system of claim 16, wherein the instructions, when executed by the at least one processor, further cause the system to:
  forecast at least one future food order based on historical food orders; and
  instruct at least one autonomous robot vehicle of the fleet to preemptively prepare the at least one future food order.

* * * * *